(12) United States Patent
Blankenship et al.

(10) Patent No.: US 8,537,862 B2
(45) Date of Patent: Sep. 17, 2013

(54) TRANSMIT DOWNLINK CONTROL INFORMATION WITH HIGHER ORDER MODULATION

(75) Inventors: Yufei Wu Blankenship, Kildeer, IL (US); Michael Eoin Buckley, Grayslake, IL (US); Zhijun Cai, Euless, TX (US); Hua Xu, Ottawa (CA); Sophie Vrzic, Nepean (CA); Shiwei Gao, Nepean (CA); Youn Hyoung Heo, Sewan (KR)

(73) Assignee: Blackberry Limited, Waterloo, Ontario (CA)

( * ) Notice: Subject to any disclaimer, the term of this patent is extended or adjusted under 35 U.S.C. 154(b) by 246 days.

(21) Appl. No.: 13/174,334

(22) Filed: Jun. 30, 2011

(65) Prior Publication Data

US 2013/0003663 A1 Jan. 3, 2013

(51) Int. Cl.
*H04J 1/00* (2006.01)
(52) U.S. Cl.
USPC ............................................ 370/483; 370/252
(58) Field of Classification Search
None
See application file for complete search history.

(56) References Cited

U.S. PATENT DOCUMENTS

| 2004/0252670 | A1* | 12/2004 | Rong et al. ................ 370/343 |
| 2008/0089281 | A1* | 4/2008 | Yoon et al. ................ 370/329 |
| 2008/0311873 | A1 | 12/2008 | Kim et al. |
| 2011/0085506 | A1 | 4/2011 | Lee et al. |
| 2011/0170496 | A1 | 7/2011 | Fong et al. |
| 2011/0194524 | A1 | 8/2011 | Hedlund et al. |
| 2011/0268062 | A1 | 11/2011 | Ji et al. |
| 2012/0039283 | A1 | 2/2012 | Chen et al. |

FOREIGN PATENT DOCUMENTS

| EP | 2302830 A2 | 3/2011 |
| WO | 2010053984 A2 | 5/2010 |
| WO | 2010105098 A1 | 9/2010 |
| WO | WO 2010105098 A1 * | 9/2010 |
| WO | 2011011566 A2 | 1/2011 |
| WO | 2011013989 A2 | 2/2011 |
| WO | 2011085189 A1 | 7/2011 |
| WO | 2011085195 A1 | 7/2011 |
| WO | 2011096646 A2 | 8/2011 |

OTHER PUBLICATIONS

Gao, Shiwei, et al., U.S. Appl. No. 13/610,396, filed Sep. 11, 2012; Title: Enhanced PDCCH with Transmit Diversity in LTE Systems.
Gao, Shiwei, et al., U.S. Appl. No. 13/610,434, filed Sep. 11, 2012; Title: Searching Space and Operating for Enhanced PDCCH in LTE Systems.

(Continued)

*Primary Examiner* — Yong Zhou
(74) *Attorney, Agent, or Firm* — Conley Rose, P.C.; J. Robert Brown, Jr.

(57) ABSTRACT

A method is provided for applying HOM to a PDCCH to transmit control information from an access node to a UE. The method comprises: selecting a DCI format for a HOM PDCCH; determining a DCI block of the HOM PDCCH according to the selected DCI format; generating a sequence of coded bits to be transmitted from the DCI block; multiplexing the sequence of coded bits of the HOM PDCCH with coded bits of other PDCCHs to form a sequence of multiplexed bits; scrambling the sequence of multiplexed bits to form a sequence of scrambled bits; modulating the scrambled bits to form a sequence of modulation symbols; and transmitting the sequence of modulation symbols, where a PDCCH is transmitted on an aggregation of one or more CCEs.

35 Claims, 8 Drawing Sheets

(56) References Cited

OTHER PUBLICATIONS

Gao, Shiwei, et al., U.S. Appl. No. 13/610,464, filed Sep. 11, 2012; Title: DMRS Association and Signaling for Enhanced PDCCH in LTE Systems.
3GPP TS 36.211 V9.1.0; 3rd Generation Partnership Project; Technical Specification Group Radio Access Network; Evolved Universal Terrestrial Radio Access (E-UTRA); Physical Channels and Modulation; Release 9; Mar. 2010; 85 pages.
3GPP TS 36.216 V10.3.0; 3rd Generation Partnership Project; Technical Specification Group Radio Access Network; Evolved Universal Terrestrial Radio Access (E-UTRA); Physical Layer for Relaying Operation; Release 10; Jun. 2011; 16 pages.
3GPP TR 36.819 V0.0.2; 3rd Generation Partnership Project; Technical Specification Group Radio Access Network; Coordinated Multi-Point Operation for LTE Physical Layer Aspects; Release 11; May 2011; 58 pages.
3GPP TSG RAN WG1 Meeting #67; "Considerations on the ePDCCH Design"; R1-113655; San Francisco, USA; Nov. 14-18, 2011; 5 pages.
3GPP TSG RAN WG1 Meeting #67; "Mapping Design for E-PDCCH in Rel-11"; R1-114081; San Francisco, USA; Nov. 14-18, 2011; 5 pages.
3GPP TSG RAN WG1 Meeting #68; "Search Space Design for E-PDCCH"; R1-120330; Dresden, Germany; Feb. 6-10, 2012; 6 pages.
3GPP TSG RAN WG1 Meeting #70; "Discussion on PUCCH A/N Resource Mapping for E-PDDCCH"; R1-123181; Qingdao, P.R. China; Aug. 13-17, 2012; 6 pages.
3GPP TSG RAN WG1 Meeting #66; "Investigation on Downlink Control Channel and Signalling Enhancements"; R1-112049; Athens, Greece; Aug. 22-26, 2011; 4 pages.
3GPP TSG RAN WG1 #60bis; "PDCCH Extension for ICIC and Capacity Gains"; R1-102224; Beijing, China; Apr. 12-16, 2010; 2 pages.
3GPP TSG-RAN WG1 Meeting #68; "Associating of DM-RS for ePDCCHs Within a PRB Pair"; R1-120385; Dresden, Germany; Feb. 6-10, 2012; 5 pages.
3GPP TSG-RAN WG1 #66; "On Downlink Control Singaling Enhancements"; R1-112292; Athens, Greece; Aug. 22-26, 2011; 2 pages.
3GPP TSG RAN WG1 #59; "PDCCH Extension to Support Operation with CI"; R1-094569; Jeju, Korea; Nov. 9-13, 2009; 2 pages.
PCT International Search Report; Application No. PCT/US2012/043683; Jan. 31, 2013; 4 pages.
PCT Written Opinion of the International Searching Authority; Application No. PCT/US2012/043683; Jan. 31, 2013; 6 pages.
PCT International Search Report; Application No. PCT/US2012/043684; Jan. 17, 2013; 3 pages.
PCT Written Opinion of the International Searching Authority; Application No. PCT/US2012/043684; Jan. 17, 2013; 5 pages.
PCT International Search Report; Application No. PCT/US2012/49015; Dec. 17, 2012; 4 pages.
PCT Written Opinion of the International Searching Authority; Application No. PCT/US2012/49015; Dec. 17, 2012; 8 pages.
PCT International Search Report; Application No. PCT/CA2012/050630; Dec. 3, 2012; 3 pages.
PCT Written Opinion of the International Searching Authority; Application No. PCT/CA2012/050630; Dec. 3, 2012; 3 pages.
PCT International Search Report; Application No. PCT/CA2012/050631; Dec. 3, 2012; 4 pages.
PCT Written Opinion of the International Searching Authority; Application No. PCT/CA2012/050631; Dec. 3, 2012; 6 pages.
PCT International Search Report; Application No. PCT/CA2012/050632; Nov. 30, 2012; 4 pages.
PCT Written Opinion of the International Searching Authority; Application No. PCT/CA2012/050632; Nov. 30, 2012; 8 pages.
Blankenship, Yufei, et al., U.S. Appl. No. 13/545,577, filed Jul. 10, 2012; Title: Design on Enhanced Control Channel for Wireless Systems.
3GPP TS 36.212 V10.2.0; 3rd Generation Partnership Project; Technical Specification Group Radio Access Network; Evolved Universal Terrestrial Radio Access (E-UTRA); Multiplexing and Channel Coding; Release 10; Jun. 2011; 78 pages.
3GPP TS 36.331 V10.2.0; 3rd Generation Partnership Project; Technical Specification Group Radio Access Network; Evolved Universal Terrestrial Radio Access (E-UTRA); Radio Resource Control (RRC); Protocol Specification; Release 10; Jun. 2011; 294 pages.
3GPP TSG-RAN WG1 #64; "Aspects on Distributed RRUs with Shared Cell-ID for Heterogeneous Deployments"; R1-110649; Taipei, Taiwan; Feb. 21-25, 2011; 11 pages.
3GPP TSG Ran WG1 Meeting #65; "DL Control Channel Enhancement for DL MIMO in Rel-11"; R1-111636; Barcelona, Spain; May 9-13, 2011; 6 pages.
3GPP TSG-RAN WG1 #65; "Enhancements for UE Specific Control Signaling"; R1-111332; Barcelona, Spain; May 9-13, 2011; 3 pages.
Blankenship, Yufei, et al., U.S. Appl. No. 13/174,342, filed Jun. 30, 2011; Title: Method and Apparatus for Enhancing Dowlink Control Information Transmission.
3GPP TS 36.213 V10.2.0; 3rd Generation Partnership Project; Technical Specification Group Radio Access Network; Evolved Universal Terrestrial Radio Access (E-UTRA); Phyiscal Layer Procedures; Release 10; Jun. 2011; 120 pages.
3GPP TS 36.211 V10.2.0; 3rd Generation Partnership Project; Technical Specification Group Radio Access Network; Evolved Universal Terrestrial Radio Access (E-UTRA); Phyiscal Channels and Modulation; Release 10; Jun. 2011; 103 pages.
3GPP TSG Ran WG1 Meeting #65; "On Enhanced Downlink Control Signalling for Rel-11;" R1-111743; Barcelona, Spain; May 9-13, 2011; 3 pages.
3GPP TSG RAN1 #50; "PDCCH Channel Estimation Impackt (1 vs 2 DRS) on System Performance;" R1-073374; Athens, Greece; Aug. 20-24, 2007; 5 pages.
3GPP TSG-RAN WG1 Meeting #47; "Performance Evaluation of P-BCH;" R1-063529; Riga, Latvia; Nov. 6-10, 2006; 6 pages.

* cited by examiner

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Table 1

| Physical channel | Modulation schemes |
|---|---|
| PDSCH/PMCH | QPSK, 16QAM, 64QAM |
| PDCCH | QPSK |
| PCFICH | QPSK |
| PHICH | BPSK |

Table 2

| Transmission mode | DCI format | Search Space | Transmission scheme of PDSCH corresponding to PDCCH |
|---|---|---|---|
| Mode 8 | DCI format 1A (QPSK) | Common and UE specific by C-RNTI | If the number of PBCH antenna ports is one, Single-antenna port, port 0 is used; otherwise Transmit diversity |
|  | DCI format 2B (16-QAM) | UE specific by C-RNTI | Dual layer transmission, port 7 and 8 or single-antenna port, port 7 or 8 |
| Mode 9 | DCI format 1A (QPSK) | Common and UE specific by C-RNTI | Non-MBSFN subframe: If the number of PBCH antenna ports is one, Single-antenna port, port 0 is used; otherwise Transmit diversity<br>MBSFN subframe: Single-antenna port, port 7 |
|  | DCI format 2C (16-QAM) | UE specific by C-RNTI | Up to 8 layer transmission, ports 7-14 |

Table 3

| PDCCH format | Number of CCEs | Number of resource-element groups | Number of PDCCH bits |
|---|---|---|---|
| 0 | 0.5 | 4.5 | 72 |
| 1 | 1 | 9 | 144 |
| 2 | 2 | 18 | 288 |
| 3 | 4 | 36 | 576 |

Table 4

Figure 7a

| Type | Search space $S_k^{(L)}$ Aggregation level $L$ | Size [in CCEs] | Number of PDCCH candidates $M^{(L)}$ | Modulation |
|---|---|---|---|---|
| UE-specific | 1 | 6 | 6 | QPSK, 16-QAM |
| | 2 | 12 | 6 | QPSK |
| | 4 | 8 | 2 | QPSK |
| | 8 | 16 | 2 | QPSK |
| Common | 4 | 16 | 4 | QPSK |
| | 8 | 16 | 2 | QPSK |

Table 5

| Type | Search space $S_k^{(L)}$ Aggregation level $L$ | Size [in CCEs] | Number of PDCCH candidates $M^{(L)}$ | Modulation |
|---|---|---|---|---|
| UE-specific | 1 | 6 | 6 | 16-QAM |
| | 2 | 12 | 6 | QPSK |
| | 4 | 8 | 2 | QPSK |
| | 8 | 16 | 2 | QPSK |
| Common | 4 | 16 | 4 | QPSK |
| | 8 | 16 | 2 | QPSK |

Table 6

| Number of antenna ports | OFDM symbol indices within a slot where the ratio of the corresponding PDDCH EPRE to the cell-specific RS EPRE is denoted by $\rho_{A,PDCCH}$ | | OFDM symbol indices within a slot where the ratio of the corresponding PDDCH EPRE to the cell-specific RS EPRE is denoted by $\rho_{B,PDCCH}$ | |
|---|---|---|---|---|
| | Normal cyclic prefix | Extended cyclic prefix | Normal cyclic prefix | Extended cyclic prefix |
| One or two | 1, 2, 3, 5, 6 | 1, 2, 4, 5 | 0, 4 | 0, 3 |
| Four | 2, 3, 5, 6 | 2, 4, 5 | 0, 1, 4 | 0, 1, 3 |

Figure 7b

TRANSMIT DOWNLINK CONTROL INFORMATION WITH HIGHER ORDER MODULATION

BACKGROUND

As used herein, the terms "user equipment" and "UE" might in some cases refer to mobile devices such as mobile telephones, personal digital assistants, handheld or laptop computers, and similar devices that have telecommunications capabilities. Such a UE might consist of a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UT-RAN) node B (eNB), a wireless access point, or a similar component rather than a traditional base station. Any such component will be referred to herein as an eNB, but it should be understood that such a component is not necessarily an eNB. Such a component may also be referred to herein as an access node.

LTE may be said to correspond to Third Generation Partnership Project (3GPP) Release 8 (Rel-8 or R8), Release 9 (Rel-9 or R9), and Release 10 (Rel-10 or R10), and possibly also to releases beyond Release 10, while LTE Advanced (LTE-A) may be said to correspond to Release 10 and possibly also to releases beyond Release 10. As used herein, the terms "legacy", "legacy UE", and the like might refer to signals, UEs, and/or other entities that comply with LTE Release 10 and/or earlier releases but do not comply with releases later than Release 10. The terms "advanced", "advanced UE", and the like might refer to signals, UEs, and/or other entities that comply with LTE Release 11 and/or later releases. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 7a and 7b contain tables related to embodiments of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure deals with the transmission of downlink control information. More specifically, methods and systems are provided that allow downlink control information to be transmitted with higher order modulation. In addition, an extended physical downlink control channel is provided that can be used to carry downlink control information.

In an LTE system, physical downlink control channels (PDCCHs) are used to carry downlink (DL) or uplink (UL) data scheduling information, or grants, from an eNB to one or more UEs. The scheduling information may include a resource allocation, a modulation and coding rate (or transport block size), the identity of the intended UE or UEs, and other information. A PDCCH could be intended for a single UE, multiple UEs or all UEs in a cell, depending on the nature and content of the scheduled data. A broadcast PDCCH is used to carry scheduling information for a Physical Downlink Shared Channel (PDSCH) that is intended to be received by all UEs in a cell, such as a PDSCH carrying system information about the eNB. A multicast PDCCH is intended to be received by a group of UEs in a cell. A unicast PDCCH is used to carry scheduling information for a PDSCH that is intended to be received by only a single UE. In cells where relays or similar components are used, the downlink control information may be carried by a relay PDCCH (R-PDCCH) or a similar channel type. Any such type of channel will be referred to herein as the PDCCH.

Figure 1:
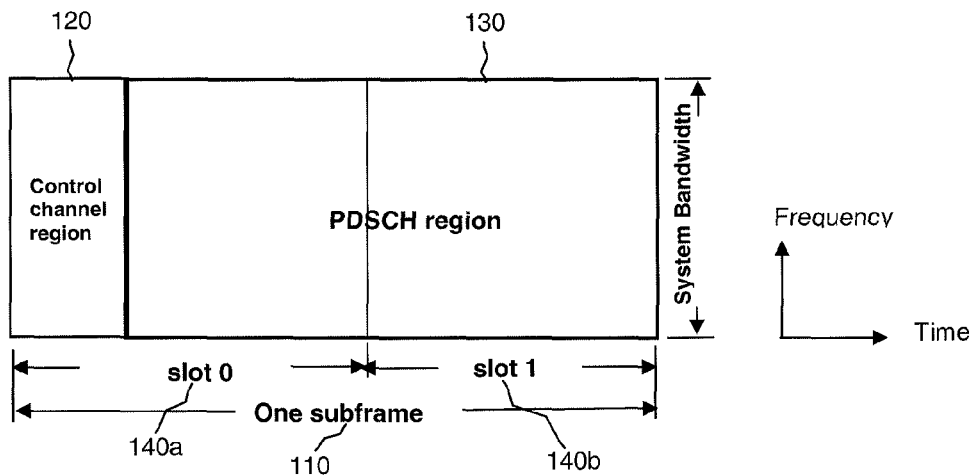
FIG. 1 is a diagram of a downlink LTE subframe, according to an embodiment of the disclosure.

FIG. 1 illustrates a typical DL LTE subframe 110. Control information such as the PCFICH (physical control format indicator channel), PHICH (physical HARQ (hybrid automatic repeat request) indicator channel), and PDCCH are transmitted in a control channel region 120. The control channel region 120 consists of the first few OFDM (orthogonal frequency division multiplexing) symbols in the subframe 110. The exact number of OFDM symbols for the control channel region 120 is either dynamically indicated by PCFICH, which is transmitted in the first symbol, or semi-statically configured for non-scheduling carriers when cross carrier scheduling is used in the case of carrier aggregation in LTE Rel-10.

The PDSCH, PBCH (physical broadcast channel), PSC/SSC (primary synchronization channel/secondary synchronization channel), and CSI-RS (channel state information reference signal) are transmitted in a PDSCH region 130. DL user data is carried by the PDSCH channels scheduled in the PDSCH region 130. Cell-specific reference signals (CRS) are transmitted over both the control channel region 120 and the PDSCH region 130.

Each subframe 110 consists of a number of OFDM symbols in the time domain and a number of subcarriers in the frequency domain. An OFDM symbol in time and a subcarrier in frequency together define a resource element (RE). A physical resource block (RB) can be defined as 12 consecutive subcarriers in the frequency domain and all the OFDM symbols in a slot in the time domain. An RB pair with the same RB index in slot 0 140a and slot 1 140b in a subframe are always allocated together.

Figure 2:
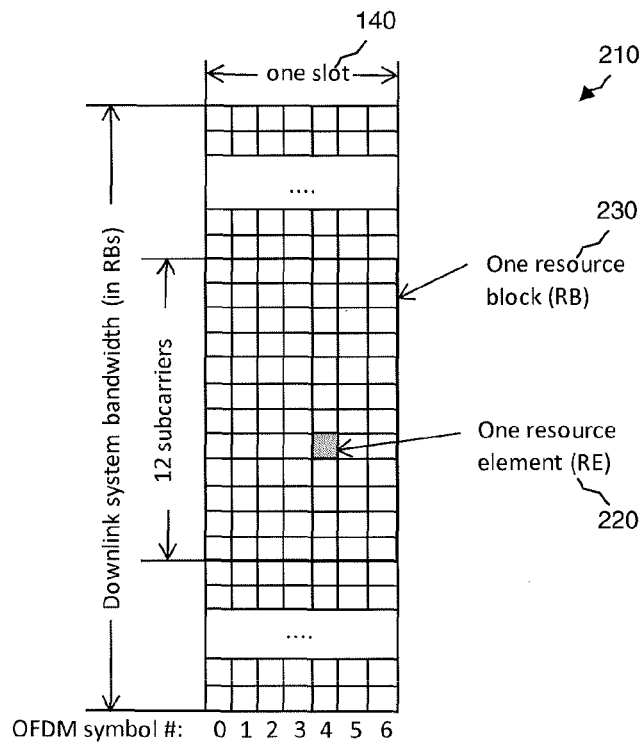
FIG. 2 is a diagram of an LTE downlink resource grid, according to an embodiment of the disclosure.

FIG. 2 shows an LTE DL resource grid 210 within each slot 140 in the case of a normal cyclic prefix (CP) configuration. The resource grid 210 is defined for each antenna port, i.e., each antenna port has its own separate resource grid 210. Each element in the resource grid 210 for an antenna port is an RE 220, which is uniquely identified by an index pair of a subcarrier and an OFDM symbol in a slot 140. An RB 230 consists of a number of consecutive subcarriers in the frequency domain and a number of consecutive OFDM symbols in the time domain as shown in the figure. An RB 230 is the minimum unit used for the mapping of certain physical channels to REs 220.

For DL channel estimation and demodulation purposes, cell-specific reference signals (CRS) are transmitted over each antenna port on certain predefined time and frequency REs in every subframe. CRS are used by Rel-8 to Rel-10 legacy UEs to demodulate the control channels. Resource element groups (REGs) are used in LTE for defining the mapping of control channels such as the PDCCH to REs. An REG consists of either four or six consecutive REs in an OFDM symbol, depending on the number of CRS configured. A PDCCH is transmitted on an aggregation of one or several consecutive control channel elements (CCEs), where one CCE consists of nine REGs. The CCEs available for a UE's PDCCH transmission are numbered from 0 to $N_{CCE}-1$. In LTE, multiple formats are supported for the PDCCH as shown in Table 1 of FIG. 7.

Downlink control information (DCI) is transmitted on the PDCCH and is used to allocate resources and assign other attributes for a shared data channel in a downlink or uplink. The PDCCH can occupy 1, 2, 4 or 8 CCEs depending on scheduling by the eNB, as shown in Table 1. Larger CCEs can transmit a large number of physical bits, and consequently a lower code rate can be achieved, assuming the DCI payload size is the same. Therefore, a UE near a cell edge will typically use a greater number of CCEs than one near the cell center.

Multiple types of modulation schemes are available in LTE for controlling the data rate based on different channel situations. For example, quadrature phase shift keying (QPSK), 16 quadrature amplitude modulation (16QAM) and 64 quadrature amplitude modulation (64QAM) are supported, in which two bits, four bits, and six bits are transmitted per modulation symbol, respectively. The term "higher order modulation" (HOM) will be used herein to refer to any modulation scheme in which more than two bits are transmitted per modulation symbol. Higher order modulation enables higher spectral efficiency and transmission at a higher data rate. For higher order modulation to be used, the channel typically needs to be in good condition as indicated, for example, with a higher signal to interference and noise ratio (SINR), and the UE typically needs to have lower mobility.

DCI has traditionally been transmitted with the QPSK modulation scheme. This dictates that the PDCCH formats can carry 72, 144, 288, or 576 coded bits, as shown in Table 1. The higher order modulation schemes, e.g., 16QAM and 64QAM, have traditionally been supported only for data channels, e.g., the PDSCH or the physical multicast channel (PMCH), as shown in Table 2 in FIG. 7. For the PDCCH and the PCFICH, only QPSK has traditionally been used. For the PHICH, only binary phase shift keying (BPSK) has traditionally been applied.

That is, in legacy versions of LTE, QPSK is used for PDCCH modulation, and this type of modulation provides robust performance for the PDCCH. However, the capacity of the PDCCH could be an issue due to the relatively low payload that QPSK modulation can carry. This issue becomes more outstanding with new features that are being considered in future versions of LTE, such as multi-user multiple-input multiple-output (MU-MIMO) and coordinated multi-point (CoMP) transmission. Since such techniques can require more capacity in the PDCCH, the capacity of the PDCCH may not be sufficient in the near future. To increase the capacity of the PDCCH, higher order modulation, such as 16QAM and 64QAM, could be introduced, since such HOM would carry more encoded bits per modulation symbol. The benefit of using HOM could be an increase in the payload size with the same resources. Alternatively, if the payload size is unchanged, fewer resources could be needed to carry the same payload, and therefore the overall PDCCH capacity for the cell could be increased.

The use of HOM is well known for the PDSCH. In such cases, the modulation type and resource allocation that are to be used for the PDSCH have traditionally been signaled to the UE in downlink or uplink grants prior to the transmission of the PDSCH. In this way, the UE knows before decoding the PDSCH which type of modulation will be used for the PDSCH.

However, several issues may arise if HOM is to be introduced into the PDCCH. First, the UE may not know prior to receiving the PDCCH which type of modulation is being used in the PDCCH. That is, since the PDCCH is typically the first signal the UE receives, there may not be a prior signal that informs the UE of the type of modulation that will be used in the PDCCH. One way of dealing with this is through blind decoding. That is, the UE may attempt to decode the PDCCH using one or more types of HOM. If the decodings fail, decoding may be attempted using QPSK.

Increasing the number of blind decodings a UE must execute per subframe entails at least two disadvantages. First, with an increased number of blind decoding attempts, there may be an associated increase in implementation decoding complexity in the UE. Second, each blind decoding attempt has a small probability of falsely detecting a non-existent PDCCH. Therefore, increasing the number of blind decodings can also increase the overall false detection probability.

Another issue with introducing HOM in the PDCCH is that multiple PDCCHs might be transmitted in the PDCCH region, which consists of the first several symbols in a subframe. As PDCCHs from different UEs might be multiplexed and interleaved before being transmitted on this limited number of symbols, the introduction of HOM, which is transmitted with more power than QPSK, may lead to a power imbalance on the symbols.

That is, the introduction of HOM may increase the payload of the PDCCH and therefore enhance PDCCH performance. However, in contrast to QPSK, the receiver needs to have power information for HOM so that the receiver can properly demodulate the control information. Additionally, power levels of each modulation symbol of the control channel may vary in the legacy control region, leading to power imbalance in the control channel on the OFDM symbols. Power imbalance may be induced by several factors. First, depending on the antenna configuration, CRSs of varying density might be placed in certain OFDM symbols. If control information shares OFDM symbols with a CSI-RS (i.e., new control information, not in the legacy control region), the CSI-RS may also cause power imbalance in the REs carrying the control information. Second, other control channels, e.g., the PCFICH and the PHICH, might be distributed unevenly over the OFDM symbols in the control region. Moreover, more power may be assigned to the PCFICH and the PHICH at the cost of the PDCCH.

For QPSK demodulation, a UE typically needs to perform only phase estimation. For 16QAM and 64QAM, the UE may additionally need to estimate the amplitude of the received data signal, because the amplitude difference represents the different constellation points of HOM. The UE derives the amplitude of the data signal based on the power ratio between the data signal and a reference signal, such as the CRS or a UE-specific RS. This power ratio is fixed for data REs in a given OFDM symbol and is signaled to the UE.

The ratio of data EPRE (energy per resource element) and reference signal EPRE is defined for higher order modulation in different ways in different circumstances. For a PDSCH that is demodulated by a CRS, the UE may assume that the ratio of PDSCH EPRE to cell-specific RS EPRE for each OFDM symbol is denoted by $\rho_A$ for OFDM symbols not including a CRS or by $\rho_B$ for OFDM symbols including a CRS as follows. $\rho_A$ is equal to $\delta_{power-offset}+P_A+10\log_{10}(2)$ dB when the UE receives a PDSCH data transmission using precoding for transmit diversity with four cell-specific antenna ports, and $\rho_A$ is equal to $\delta_{power-offset}+P_A$ dB otherwise. $\delta_{power-offset}$ is 0 dB for all PDSCH transmission schemes except MU-MIMO and $P_A$ is a UE-specific parameter provided by higher layers.

For a PDSCH that is demodulated by a UE-specific RS, the UE may assume that the ratio of PDSCH EPRE to UE-specific RS EPRE is equal to 0 dB for 16QAM and 64QAM. For a PMCH, the UE may assume that the ratio of PMCH EPRE to MBSFN RS EPRE is equal to 0 dB for 16QAM and 64QAM.

Embodiments of the present disclosure address these issues that might arise when attempts are made to increase the capacity of the PDCCH. More specifically, embodiments of the present disclosure improve the capacity of the PDCCH by using higher order modulation to carry downlink control information. Additionally or alternatively, embodiments of the present disclosure provide an extended PDCCH region that can be used to carry downlink control information.

In these embodiments, possible modifications of PDCCH formats or new features are provided to resolve the issues described above. Embodiments related to the use of HOM in the PDCCH will be considered first. Issues that are addressed in these embodiments include the use of HOM in the legacy PDCCH region, the search space for HOM, scrambling, the configuration of HOM, and power control for HOM. While these issues are discussed separately below, it should be understood that the embodiments related to these issues could be used in any combinations that are not mutually exclusive. Examples could include, but are not limited to, the use of HOM in the legacy PDCCH region in combination with the search space for HOM, scrambling, the configuration of HOM, and/or power control for HOM.

Regarding the use of HOM in the legacy PDCCH region, it may be desirable for backward compatibility purposes that HOM be used in the legacy PDCCH region only for advanced UEs rather than for all UEs. In an embodiment, if a cell serves both legacy UEs and advanced UEs, HOM is not applied to PDCCHs used for all UEs, such as common control channels. Such PDCCHs have the cyclic redundancy check (CRC) scrambled by the system information radio network temporary identifier (SI-RNTI), the paging RNTI (P-RNTI), or similar identifiers. Instead, HOM is applied only for UE-specific control channels, which are PDCCHs with the CRC scrambled by a cell RNTI (C-RNTI) or a semi-persistent scheduling (SPS) C-RNTI. In addition, new PDCCH formats are introduced to achieve higher efficiency in the control region. If 16QAM is introduced, the number of PDCCH coded bits is doubled given the same number of REs. Equivalently, half the number of REs is sufficient to transmit the same payload of a given DCI format, if the same code rate is used. To take advantage of the reduced number of REs with HOM, a new type of CCE containing a smaller number of REGs is defined.

In other words, HOM can be applied to advanced UEs in the UE-specific/common search space. Also, a new CCE can be defined with a reduced number of REGs for use with HOM. In addition, a PDCCH with HOM can be applied with certain RNTI, DCI, and application scenarios, such as cases where relays are deployed. Further, HOM can be used in an extended PDCCH region, as described in more detail below.

More specifically, with regard to the use of HOM in the legacy PDCCH region, modifications and/or new features are described herein to resolve issues related to supporting HOM in the PDCCH. Although both 16QAM and 64QAM can be used as HOM, 16QAM is mainly considered herein for PDCCH enhancement, because 64QAM may require a high SINR and thus may not be desirable for PDCCH transmissions that carry a relatively small payload.

For a given UE, HOM can be applied to some sets of downlink control information and not applied to other sets of downlink control information. For example, HOM can be used for a PDCCH that has the CRC scrambled by the C-RNTI. For semi-persistent scheduling, (for example, the CRC of the PDCCH is masked by the SPS C-RNTI), QPSK may still be desirable in the sense that the PDSCH of the SPS may be expected to mostly use QPSK in an LTE system even if HOM is supported in the PDSCH. This is because fast link adaptation is not possible due to the signaling overhead. Further, the PDCCH of the SPS is used for activation/deactivation of SPS transmission, which means reliability is of higher importance than capacity. However, if the relay backhaul channel is considered, since the SINR may be quite improved, both the PDCCH and the PDSCH for SPS users could still use HOM to achieve capacity gain. Overall, while the PDCCH of the SPS is not excluded from using HOM, a typical scenario is that QPSK is used for a PDCCH with the CRC scrambled by SPS C-RNTI, while HOM is used for a PDCCH with the CRC scrambled by C-RNTI.

For common control channels in the legacy control region (for example, the CRC of the PDCCH is masked by SI-RNTI, P-RNTI, RA-RNTI, or M-RNTI), HOM can be used if the common control channels are defined for advanced UEs only, e.g., if a new 'SI-RNTI' is defined for a new SI of Rel-11 or later. On the other hand, using HOM for common control channels may be difficult since a high SINR is needed to apply HOM, and it is rare for all UEs in a cell to have a high SINR. Thus, while HOM may not be excluded, QPSK may be expected to be the preferred modulation for common control information.

Large payload DCIs might benefit more from HOM, especially for cases of a QPSK/high code rate combination in aggregation level 1 or 2. Additionally, since large payload DCIs are usually associated with multi-layer PDSCH transmissions, which indicate that a high SINR is seen by the UE, the channel conditions may also be suitable for HOM for the PDCCH. Thus, in an embodiment, HOM is specified or configured for certain DCI formats, for example DCI format 2/2A/2B/2C, or for transmission modes using these DCI formats. In one example, the transmission mode (TM) and corresponding DCI formats can be used as criteria to select HOM. For instance, if the UE has been notified to operate with Mode 8, then both the eNB and the UE could assume that DCI format 1A (if sent) uses QPSK, whereas DCI format 2B (if sent) uses 16QAM. Such an example is illustrated in Table 3 in FIG. 7. In general, this implicit signaling can be applied to all transmission modes that use multi-layer spatial multiplexing, including TM 4, 6, 8, and 9 defined in legacy releases, and any TM using spatial multiplexing that may be defined in future releases. For these TMs, the DCI formats used to schedule multiple-layer transmission could be assumed to use HOM, while DCI format 1A, which is the fall-back DCI format, could be assumed to use QPSK. This implicit signaling of HOM usage for the PDCCH could be applicable to advanced UEs.

Alternatively, HOM PDCCH transmission can be defined for certain scenarios that are likely to have a high SINR, for example, the relay backhaul channel or pico-cells.

HOM can be applied in a new control region as well, where the new control region refers to REs carrying control information outside the legacy control region (i.e., the first 1-4 OFDM symbols). For example, HOM could be applied in the relay control region, which resides in the data region and is used to carry the relay PDCCH (R-PDCCH). HOM could be applied in other new control regions as well, which may be defined for scenarios such as Hetnet, CoMP, or eICIC.

Since each QPSK symbol carries two bits and each 16QAM symbol carries four bits, the amount of resources is cut by half for the same number of PDCCH bits if 16QAM is used instead of QPSK for the PDCCH. This is illustrated in Table 4 in FIG. 7.

Considering the performance of modulation and coding rate combinations, lower order modulation (e.g., QPSK) is typically used for scenarios that can only support lower spectral efficiency, and higher order modulation (e.g., 16QAM) is typically used for scenarios that can support higher spectral efficiency. Given the same R×q, where R is the code rate and q is the modulation level, if R becomes too high for QPSK (q=2), the transmission can switch to a code rate of R/2 with 16QAM (q=4) to get better link performance. Roughly, the switch could happen around R=0.6 for QPSK-to-16QAM switching.

The DCI size varies as a function of many factors including the system bandwidth and the DCI type. The DCI size typically falls in the range of 20-80 bits in legacy LTE. This indicates that DCI of small size has a low code rate even if the smallest PDCCH format (i.e., 1 CCE and QPSK) is used. For example, a DCI of size k=20 will have a code rate of 0.28 even if 1 CCE and QPSK is used. In this case, switching to a code rate of 0.14 and 16QAM does not bring any performance gain. On the other hand, a DCI of larger size can obtain performance gain by switching to 16QAM. For example, a DCI of size k=72 will have a code rate of 1.0 if 1 CCE and QPSK is used (i.e., no protection from coding). In this case, switching to a code rate of 0.5 and 16QAM will bring substantial performance gains from the link level performance. This shows that 16QAM with a code rate of 0.5 would perform better than QPSK with a code rate of 1.0, even though these two modulation and coding schemes convey the same data rate.

Small size DCIs may not benefit from using HOM due to insufficient realizable coding gain with HOM if the current CCE granularity is maintained. On the other hand, performance gain is possible if CCE granularity can be reduced to a smaller number of REs than one CCE can accommodate at this stage (i.e., 18 REs). For a UE configured with HOM, the aggregation levels can be 0.5, 1, 2, and 4, as shown in Table 4, instead of 1, 2, 4, and 8, as shown in the legacy Table 1.

In another example, a new integer number of REGs can be defined for a new, smaller CCE, and control channels can be interleaved on a REG basis. For example, the REG of the first PDCCH can be interleaved with the REG of the second PDCCH. It may be difficult to divide a REG into 0.5 REG, because four consecutive REs should typically be used to support transmit diversity in the case of four transmit antennas. Therefore, it may be easier to define a new, smaller integer number of REGs as a CCE. One example is to define six REGs for one new, smaller CCE to be used for PDCCH multiplexing with other aggregation levels. For example, three UEs having the new, smaller new CCE, each containing six REGs, can be multiplexed in two current CCEs each containing nine REGs. The introduction of this new, smaller CCE would then be transparent to legacy UEs, and would therefore reduce the impact to the legacy PDCCH region.

In summary, advanced UEs have the option of using fractional CCEs (assuming the legacy CCE definition) so as to utilize time/frequency resources more efficiently, when channel conditions permit. This is expected to give the eNB scheduler more flexibility, where more UEs can be packed into the same control region, and where fewer collisions may happen between control channels.

If it is preferred to maintain the current CCE definition for backward compatibility considerations, two UEs can be multiplexed in one CCE (0.5 CCE per UE). When multiple UEs are multiplexed into the same set of CCEs, in one alternative, these UEs may be grouped into a UE group and assigned a group ID. Blind decoding could be performed for each UE in the group based on the group ID, e.g., a UE group RNTI. After the blind decoding, each UE could determine its own control information according to the signaled or pre-defined multiplexing structure for the UE group.

Multiplexing multiple PDCCHs on one CCE may be applicable only to advanced UEs, as legacy UEs could still consider one CCE to be the minimum control channel element. For advanced UEs, there may be different ways of multiplexing multiple PDCCHs into the same CCE, such as frequency division multiplexing (FDM) or code division multiplexing (CDM). In one FDM example, multiple PDCCHs from different UEs could be arranged consecutively, where one PDCCH fills REGs first and is then followed by another PDCCH. In another FDM example, the PDCCH for downlink assignment and the PDCCH for uplink assignment of the same UE can each occupy a portion of L CCEs, and they can be concatenated and transmitted over L CCEs in a fixed order, where L∈{1,2,4,8} is the aggregation level for one legacy control channel. For example, a downlink assignment could be transmitted first followed by an uplink assignment or vice versa. Arrangements like this can be implicitly signaled. For example, higher layer signaling can specify that a relay node operates in this mode. That is, downlink and uplink assignments could be packed into the first slot to reduce signaling overhead. In one CDM example, PDCCHs of different UEs could be multiplied with UE-specific orthogonal sequences before sharing the same L CCEs. A similar operation could be used to group PHICHs of different UEs onto the same set of REs.

Turning to the issue of the search space for HOM, if HOM is allowed for all PDCCH candidates and a UE needs to blindly decode between QPSK and HOM, the number of blind decodings will be doubled. In an embodiment, to prevent an increase in blind decoding, 16QAM or some other HOM is applied to only certain CCE aggregation levels. For example, HOM might be used only when the CCE aggregation level L=1. In other embodiments, the use of HOM might be associated with other CCE aggregation levels. The CCE aggregation level is an accumulation of CCEs on which a PDCCH could be transmitted and has been defined as either 1, 2, 4, or 8, which means 1, 2, 4, or 8 CCEs could be used to transmit the PDCCH. If HOM is associated with CCE aggregation in this way, HOM could be used for a PDDCH starting in any location, especially for certain scenarios such as when relays are used. Also, HOM could be used implicitly with certain CCE aggregation levels and PDCCH candidates.

More specifically, in LTE, all PDCCHs for different UEs are transmitted in the same PDCCH region. The starting location of a PDCCH is not directly specified even though the approximate location of a PDCCH could be estimated from the RNTI assigned to the UE. Since the exact PDCCH starting location is not known, the UE performs blind decoding in the search spaces and attempts to find its potential PDCCH from all the PDCCH candidates. The PDCCH candidates here refer to different aggregation levels of CCEs, and for each aggregation level, the PDCCHs have different starting locations. As the UE does not know the CCE aggregation level and the possible starting locations used by the eNB, the UE blind decodes all these PDCCH candidates to find its PDCCH. To control the number of blind decodings in such situations, several embodiments are provided related to the search space where PDCCHs that use HOM are possibly located.

One solution is to support HOM for all existing PDCCH candidates. While simple, this solution will double the number of blind decodings at the UE since each PDCCH candidate needs to be tested to determine whether it is using QPSK or 16QAM.

Alternatively, the search space for HOM can be defined to be a subset of the legacy search space so that blind decodings due to HOM are reduced. For example, 16QAM is associated with only certain aggregation levels. As illustrated in Table 5 of FIG. 7, aggregation level L=1 can be associated with both QPSK and 16QAM (rather than QPSK only), which increases the total number of blind decodings from 44 to 50 (i.e., 6 additional blind decodings due to HOM). In another alternative, 16QAM or some other HOM is associated with only certain candidates in a certain CCE aggregation level. For example, 16QAM might be associated with the first three candidates out of the six candidates in total for CCE aggregation level L=1, which would increase the total number of blind decodings from 44 to 47 (i.e., 3 additional blind decodings due to HOM). This type of design can be realized by expanding the existing PDCCH candidates monitored by a UE.

In yet another alternative, the number of blind decoding is fixed to be the same as in the legacy case, which is 44 blind decodings. However, some of the PDCCH candidates are associated only with 16QAM or some other HOM rather than with QPSK. Therefore, the total number of PDCCH candidates remains the same since each PDCCH candidate is associated with only one modulation type—some are associated with QPSK only and some are associated with HOM only. In this way, the number of blind decodings does not increase, while the flexibility to use HOM is achieved. In this case, there will be no impact to legacy UEs because HOM is applied to PDCCHs transmitted in a UE-specific search space configured for advanced UEs. An example in Table 6 of FIG. 7 illustrates this design.

In other embodiments, HOM can be associated with an entirely new search space. For example, HOM can be tied to another necessity such as a relay-specific control region.

Turning to the issue of scrambling, since a PDCCH with HOM could be used in the legacy PDCCH region, the bit scrambling operation may need to be modified to make the operation transparent to legacy UEs. That is, bit-level, cell-specific scrambling is currently performed on PDCCHs, wherein a plurality of PDCCHs for different UEs are placed in a queue based on the RNTIs of the UEs and a scrambling sequence is then generated for the PDCCHs. However, if HOM is introduced for some UEs, it may not be possible to multiplex the UEs that use HOM with the UEs that do not use HOM.

In an embodiment, to avoid any impact to legacy UEs, the scrambling of PDCCHs with HOM could be separated from the scrambling of legacy PDCCHs. Cell-specific or UE-specific scrambling sequences could be used to scramble PDCCHs with HOM. That is, scrambling of HOM PDCCHs and legacy PDCCHs could be accomplished separately, while the scrambling sequences for PDCCHs with HOM could be cell-specific or UE-specific.

More specifically, if a PDCCH with HOM is transmitted in the legacy PDCCH region or the R-PDCCH region, consideration needs to be given to PDCCH multiplexing and scrambling that can support HOM. In the legacy specifications, the encoded bits from all PDCCHs in the control region are concatenated and scrambled with a single cell-specific scrambling sequence. Specifically, the block of bits $b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$ is scrambled with a cell-specific sequence prior to modulation, resulting in a block of scrambled bits $\tilde{b}(0), \ldots, \tilde{b}(M_{tot}-1)$ according to $\tilde{b}(i)=(b(i)+c(i))\bmod 2$, where the scrambling sequence c(i) is given in Section 7.2 of 3GPP Technical Specification (TS) 36.211. The scrambling sequence generator is initialized with $c_{init}=\lfloor n_s/2 \rfloor 2^9 + N_{ID}^{cell}$ at the start of each subframe. CCE number n corresponds to bits $b(72n), b(72n+1), \ldots, b(72n+71)$.

When HOM is supported, one CCE corresponds to 144 bits (assuming 16QAM) instead of 72 bits, breaking the rule of CCE number n corresponding to $b(72n), b(72n+1), \ldots, b(72n+71)$. If CCE n uses HOM, all CCE m, m>n, no longer correspond to $b(72m), b(72m+1), \ldots, b(72m+71)$. For transparency to legacy UEs, the HOM PDCCHs may need to be scrambled separately from the legacy PDCCHs.

In an embodiment, this can be achieved by defining two scrambling sequences, one for the existing QPSK modulation, and the other for the new HOM modulation. Again, 16QAM is used as an example of HOM to facilitate the discussion of the following embodiments.

The block of bits $b^{(i)}(0), \ldots, b^{(i)}(M_{bit}^{(i)}-1)$ on each of the control channels to be transmitted in a subframe is multiplexed. $M_{bit}^{(i)}$ is the number of bits in one subframe to be transmitted on physical downlink control channel number i.

The multiplexing results in a block of bits $b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$, where $n_{PDCCH}$ is the number of PDCCHs transmitted in the subframe.

Two scrambling sequences $c_{qpsk}$ and $c_{16-qam}$ are defined for the PDCCH using QPSK and 16QAM, respectively. The scrambling sequence generator for both $c_{qpsk}$ and $c_{16-qam}$ are initialized with $c_{init} = \lfloor n_s/2 \rfloor 2^9 + N_{ID}^{cell}$ at the start of each subframe.

Let $n_{PDCCH}$ be the number of PDCCHs transmitted in the subframe, $n_{PDCCH} = n_{PDCCH}^{QPSK} + n_{PDCCH}^{16-QAM}$. The block of bits $b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$ are scrambled with a cell-specific sequence prior to modulation. The next scrambling ensures that the appropriate scrambling code (for QPSK or 16QAM) begins at the expected point at the starting boundary of each CCE. For a PDCCH using QPSK, bits on CCE number n are scrambled by $c_{qpsk}(72n), c_{qpsk}(72n+1), \ldots, c_{qpsk}(72n+71)$, and the scrambled bits are obtained by $b(i) = (b(i) + c_{qpsk}(i)) \bmod 2$. In other words, for a PDCCH using QPSK, coded bits on a CCE number are scrambled by a scrambling sequence of length $2 \times N_{RE}$, where $N_{RE}$ is the number of useful resource elements (REs) in a CCE. For LTE, there are 36 useful REs in a CCE, i.e., $N_{RE} = 36$.

For example, if HOM of type 16QAM is used, q=4. Thus, for a PDCCH using 16QAM, bits on CCE number n are scrambled by $c_{16-qam}(144n), c_{16-qam}(144n+1), \ldots, c_{16-qam}(144n+143)$, and the scrambled bits are obtained by $b(i) = (b(i) + c_{16-qam}(i)) \bmod 2$.

In general, for a HOM PDCCH, the coded bits on CCE number n are scrambled by a scrambling sequence $c_{HOM}(q_2 \times N_{RE} \times n), c_{HOM}(q_2 \times N_{RE} \times n+1), \ldots, c_{HOM}(q_2 \times N_{RE} \times (n+1)-1)$, and the scrambled bits are obtained by $b(i) = (b(i) + c_{HOM}(i)) \bmod 2$, and for a non-HOM PDCCH, bits on CCE number m are scrambled by a scrambling sequence $c_{non-HOM}(q_1 \times N_{RE} \times m), c_{non-HOM}(q_1 \times N_{RE} \times m+1), \ldots, c_{non-HOM}(q_1 \times N_{RE} \times (m+1)-1)$, and the scrambled bits are obtained by $b(i) = (b(i) + c_{non-HOM}(i)) \bmod 2$. Integer $q_1$ is the order of the non-HOM, and integer $q_2$ is the order of the HOM. There can be multiple higher order modulations defined for the PDCCH, for example, 8-PSK, 16-QAM, 64-QAM. There can also be multiple non-higher order modulations defined for the PDCCH, for example, BPSK and QPSK.

If necessary, <NIL> elements are inserted in the block of bits prior to scrambling to ensure that the PDCCHs start at the CCE positions described in the legacy specifications and to ensure that the length $M_{tot} = 8 N_{REG}^{QPSK} + 16 N_{REG}^{16-QAM} \geq \sum_{i=0}^{n_{PDCCH}-1} (M_{bit}^{(i)})$ of the scrambled block of bits matches the amount of resource element groups not assigned to the PCFICH or the PHICH.

To achieve the cell-specific bit scrambling defined in the legacy specifications, the eNB could still assume the new PDCCHs with HOM use QPSK modulation and therefore could allocate a corresponding number of scrambling bits to those PDCCHs. This would allow the same scrambling bits to be applied to legacy UEs regardless of whether there are new PDCCHs with HOM in the queue.

Figure 3:
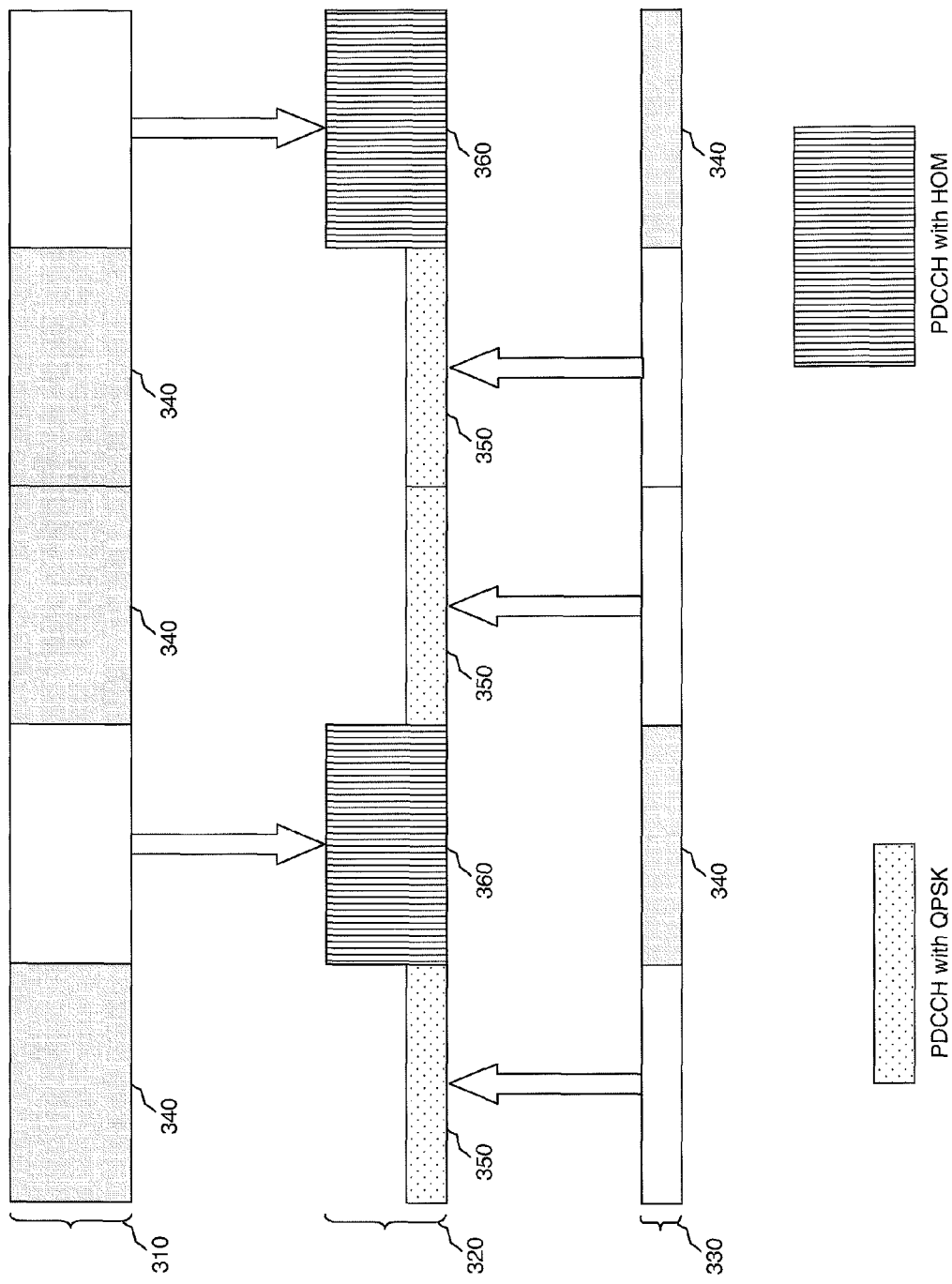
FIG. 3 is a diagram of a scrambling procedure, according to an embodiment of the disclosure.

This is illustrated in FIG. 3, where each block represents one CCE worth of bits (QPSK or HOM). Row 310 represents the new scrambling sequence for a PDCCH with HOM. Row 330 represents the legacy scrambling sequence for a PDCCH without HOM. Row 320 represents the multiplexing of PDCCH with HOM and PDCCH with QPSK. The solid shaded blocks 340 represent scrambling bits generated but not actually used. These bits ensure that legacy UEs are scrambled with the same bits whether or not HOM is used.

Separate bit scrambling sequences are generated for scrambling PDCCHs with HOM. The sequences would be generated as in the legacy specifications, but with a double sequence length. Blocks 350 represent PDCCH bits with QPSK, and blocks 360 represent PDCCH bits with HOM. The arrows illustrate the scrambling operation, which applies bit-wise multiplication of scrambling bits from scrambling sequences in 310 or 330 to their corresponding coded PDCCH bits in 320.

With this procedure, there is no impact to legacy UEs for the bit descrambling operation, as those UEs are not aware of the new PDCCHs with HOM. For advanced UEs that support PDCCHs with HOM, bit scrambling processes similar to those defined in the legacy specifications could be applied with a separate bit scrambling sequence defined for HOM. For a new PDCCH with HOM, the bit scrambling sequence could be a cell-specific sequence as shown in FIG. 3 as an example, but a UE-specific scrambling sequence would also be an option.

Turning to the issue of the configuration of HOM, in an embodiment, the eNB can configure the use of HOM dynamically or semi-statically. In the case of dynamic configuration, the UE could detect the modulation level with blind decoding. To minimize the increase in blind decodings, dynamic modulation can be applied for the PDCCH having the smallest CCE, i.e., one CCE aggregation level. In the case of semi-static signaling, the use of HOM is configured via higher layer signaling. Although HOM is configured, HOM might be used with certain RNTIs or with certain DCI formats or in a UE-specific search space only. In other words, in these embodiments, the configuration of HOM may not be signaled to the UE, and the UE may need to do blind decoding of QPSK and HOM modulation for its PDCCH. Alternatively, the configuration of HOM could be signaled semi-statically to the UE through high layer signaling. In addition, configuration of HOM could be implicitly signaled to the UE through its linkage with such attributes as transmission mode, DCI formats, and transmission layers.

More specifically, in some embodiments, the eNB can apply HOM dynamically to the control information without explicit configuration. In these cases, HOM could be applied to the control information for all advanced UEs on all subframes. The burden would be on the UE to detect the PDCCH (16QAM or QPSK) via blind decoding. Namely the UE would need to do blind decoding to determine if QPSK or HOM, such as 16QAM, is used in certain scenarios. While this method is simple in that it needs no higher layer signaling to configure the use of HOM, it can increase the number of blind decodings for the UE. For example, if all 1 CCE candidates could possibly have either QPSK or 16QAM, then 12 more blind decodings would be needed, increasing the maximum number of blind decodings from 44 to 56. In addition to increased implementation complexity, a higher rate of false positives may result from the increased number of blind decodings, and therefore the system performance could be degraded.

In other embodiments, the use of HOM is configured semi-statically, where the eNB notifies certain UEs to switch to HOM via higher layer signaling before actually applying HOM. Semi-static configuration may be a particularly good choice for stationary relay nodes due to the fairly constant channel conditions of the backhaul channel. Semi-static configuration of HOM could be UE-specific. In another alternative, the semi-static configurations can be made to a group of UEs or could even be cell specific.

In an embodiment, a one-bit radio resource control (RRC) signal (or one-bit field in an information element carried by the RRC) could be used to indicate that HOM is turned on for the PDCCH. That is, to reduce overhead, only a semi-static RRC signaling message is needed to trigger HOM. Specifically, a one-bit field modulationOrder can be defined for the PDCCH-Config information element. If modulationOrder=0, QPSK is used, and if modulationOrder=1, 16QAM is used. Since this removes the ambiguity about the modulation, the UE needs to perform fewer blind decodings compared with dynamically using HOM without explicit configuration. Note that this could also be done via other signaling alternatives, such as the MAC control elements.

Alternatively, the eNB could notify the UE that certain PDCCH candidates are now associated only with 16QAM while the others are still associated with QPSK. This procedure may retain the same number of blind decodings as in the legacy case while achieving the flexibility to use HOM. Some pre-defined configurations could be used in this case in order to optimize the RRC signaling. For example, RRC signaling might only need to provide notification of the pre-configuration index.

As an example, a table could be pre-defined which contains different combinations of PDCCH candidates where HOM could be used. Then an RRC signal containing the index of such a table would indicate to the UE that the UE should assume that the corresponding candidates use HOM. A price may need to be paid in the format of the RRC signaling in this case. If the RRC signaling does not need to be sent frequently, i.e., when channel conditions do not vary rapidly, this overhead is negligible. As another example, some rules could be defined and signaled to the UE about the application of the HOM. For example, the HOM might apply only to the PDCCH candidates with an aggregation level larger than 4.

Before RRC configuration of HOM, the UE can assume QPSK is used as the default modulation for its PDCCH transmission. After HOM is configured, HOM can be used for a certain RNTI or a certain DCI format or a certain UE-specific search space only, as described above. Whether or not the PDCCH is transmitted with HOM can be defined so that both the eNB and the UE implicitly understand whether HOM is used for a certain DCI format or a certain RNTI or a certain search space after the triggering. PDCCHs not defined to be associated with HOM are transmitted with QPSK regardless of the RRC signaling. Reliable, universal DCI formats could be defined and used to ensure that, during the transient period of the configuration change (i.e., RRC signaling is sent but acknowledgement has not been received at the eNB), the configuration change is understood by both the eNB and the UE. This universal DCI format could be used for both QPSK-to-HOM changes and HOM-to-QPSK changes so that there is no ambiguity as to which modulation is currently applied. Alternatively, it can be simply assumed that the new configuration takes effect immediately as is currently assumed for other configuration changes.

While semi-static configuration is effective, to avoid signaling overhead while limiting the blind decodings, it may be desirable to define implicit signaling for HOM so as to eliminate the need for higher layer signaling. That is, both the eNB and the UE might implicitly understand that HOM is switched on if one set of conditions are satisfied and that HOM is switched off if another set of conditions are satisfied. The basic principle is that if certain signaling indicates that the UE has good channel conditions (a typical scenario is that the UE is at the cell center and close to the eNB), then HOM is used. Otherwise, if certain signaling indicates that the UE has weak channel conditions (a typical scenario is that the UE is at the cell edge), then QPSK is used. As described above, the transmission mode and corresponding DCI formats can be used as criteria to select HOM. In this case, a synchronization scheme between the eNB and the UE may need to be defined to ensure that the switching is synchronized.

In an alternative embodiment, the transmit power control (TPC) signal on PDSCH/PUCCH/PUSCH power control can be used as an implicit signaling for HOM. For example, HOM is assumed if the TPC Command Field in DCI format 0/3/4 is 0 or 1, indicating absolute $\delta_{PUSCH,c}$ dB of −4 dB and −1 dB, respectively.

Turning to the issue of power control for HOM, in order for the UE to perform demodulation of HOM, information related to the transmit power level may need to be conveyed to the UE. In one embodiment, the average power ($P_{avg}$) of the PDCCH is configured with HOM demodulation using higher layer signaling. In another embodiment, the power level is signaled to the UE. To resolve the power imbalance issues raised above, in an embodiment, different power levels can be configured for different OFDM symbols depending on whether or not the OFDM symbol includes CRS (and CSI-RS if control information is transmitted in the data region).

In other words, the ratio of the average power level of a PDCCH with HOM to the CRS could be signaled to the UE. Alternatively, the power ratio of the PDCCH EPRE to the CRS EPRE could be derived from the power ratio for the PDSCH. Alternatively, the power ratio of the PDCCH EPRE to the CRS EPRE could be signaled to the UE through higher layer signals. Alternatively, if DM-RS is used for PDCCH demodulation and the power ratio of the PDCCH and the DM-RS is the same (or constant as pre-defined), the power level of the PDCCH does not need to be signaled.

More specifically, with regard to power control, it may sometimes be preferable to use a PSK-based HOM such 8-PSK. Since PSK modulation symbols have constant envelopes, the information is carried by the phase information only. Thus, for PSK-based HOM, the UE does not need power information for the PDCCH in order to demodulate and decode. In contrast to QPSK, the receiver does need to have power information for QAM-based HOM in order to properly demodulate and decode the control information. Thus, the discussion below is applicable when QAM-based HOM (i.e., not PSK-based) is used for downlink control information transmission.

When power control for the PDSCH is managed, consideration may need to be given to a wide range of MIMO configurations including MU-MIMO and different types of reference signals transmitted within the same OFDM symbol as the PDSCH. Power control for the PDCCH in the legacy control region, on the other hand, can be simplified compared to the PDSCH since the legacy PDCCH only uses a single antenna or transmit diversity, does not use MU-MIMO, and only has the CRS for a reference signal. Four different methods for transmitting power level information will now be considered.

In the first method, the power ratio of the PDCCH to the CRS could be signaled similarly to the signaling of the PDSCH power information as described above. Such power level signaling could be UE-specific and could be sent to the UE semi-statically through higher layer signaling such as RRC. However, the power levels of each modulation symbol of the control channel are likely to vary, and this variation could lead to power imbalance in the control channel. Power imbalance could be caused by the fact that a CRS and a CSI-RS with different densities could be placed in certain OFDM symbols, depending on the antenna configuration. Also, other control channels such as the PCFICH and the PHICH could be distributed unevenly over the OFDM symbols in the control region. Moreover, more power may be assigned to the PCFICH and the PHICH at the cost of the PDCCH.

The power imbalance issue of the control channel can be managed in several ways. One way is to simply define that the REs carrying HOM of a given UE need to have approximately the same power regardless of which OFDM symbol they are transmitted on. This rule will limit signaling overhead, since only one value, namely the power level of the DL control channel using HOM, needs to be signaled. Specifically, the eNB can semi-statically send the average power, $P_{avg}$, of the PDCCH using HOM via RRC signaling, where $P_{avg}$ indicates a reference power ratio of the control channel REs relative to the CRS and is provided by a field in an information element PDCCH-configuration. In the simplest form, $P_{avg}$ indicates the average power ratio of the control channel REs relative to the CRS, and the same $P_{avg}$ can be used as the actual power for all the control channel REs.

If it is desired to assign varying power to the control channel REs to account for the different levels of power a particular PDCCH needs, then a table of $P_A$ can be defined to account for power differences between different DCI sizes, aggregation levels, OFDM symbol indices, etc. For example, $P_{avg}$ may indicate the power ratio of the control channel REs relative to the CRS, assuming a particular DCI (e.g., DCI format 0) with a particular CCE size (e.g., 1 CCE) and QPSK. Then a $P_A$ table can be defined for other DCIs and other CCE sizes with 16QAM. The table of $P_A$ can be predefined and thus does not need to be signaled over the air. The actual power used for a specific PDCCH is $P_{avg}+P_A$ relative to the CRS.

One possible drawback of this approach is that the power of all the symbols of the control channel might be limited by the lowest power level the control channel symbols can take. Typically, the PDCCH REs in the first OFDM symbols are likely to be a bottleneck since the power of the PDCCH REs is likely to be borrowed to boost the PCFICH and the PHICH.

In a second method for transmitting power level information, the power levels of PDCCH REs with HOM can be allowed to vary. The eNB can semi-statically send via RRC signaling a parameter that provides the power difference between the PDCCH and the CRS. This technique can be used because it can be assumed that the downlink cell-specific RS EPRE is constant across the downlink system bandwidth and constant across all subframes until different cell-specific RS power information is received. As described above, UE-specific parameters $\rho_A$ and $\rho_B$ have been defined for the ratio of the PDSCH EPRE to the CRS EPRE, with $\rho_A$ for the OFDM symbols without CRS and $\rho_B$ for the OFDM symbols with CRS.

To take advantage of the existing signaling, a parameter $\rho_{A,PDCCH}$ (dB) can be defined for PDCCHs using HOM and can be sent by the eNB via higher layer signaling. $\rho_{B,PDCCH}$ is obtained by $\rho_{B,PDCCH}=\rho_{A,PDCCH}/(\rho_A/\rho_B)$.

$\rho_{B,PDCCH}$ can be computed without additional signaling, since $(\rho_A/\rho_B)$ is already specified by the cell-specific parameter $P_B$. The parameter $\rho_{A,PDCCH}$ (dB) can be directly defined or defined relative to $\rho_A$, for example with an offset to $\rho_A$. Similar to the PDSCH, as an example, the PDCCH with HOM can use Table 7 in FIG. 7 to specify the power of PDCCH REs on different OFDM indices.

Table 7 may be modified to cover only OFDM symbols that carry a downlink control channel. For example, if only the legacy PDCCH region is of concern, then only OFDM symbols 0-3 of the first slot need to be covered by the table. In another example, if only the R-PDCCH is of concern, then only OFDM symbols defined for the R-PDCCH need to be defined and can be specified separately for the first slot and the second slot of a subframe. Additionally, the table can be modified to account for OFDM symbols carrying certain information. For example, OFDM symbol #0 may need a separate power level to account for the existence of the PCFICH and the PHICH.

In a third method for transmitting power level information, the power ratio of the PDCCH EPRE to the CRS EPRE can be signaled separately for each of the OFDM symbols that carry control channels. This can be realized by defining one power parameter field for each OFDM symbol in the information element PDCCH-config in RRC signaling. For example, similar to the PDSCH, two parameters, $\rho_{A,PDCCH}$ and $\rho_{B,PDCCH}$, could be defined as the ratio of the PDCCH EPRE to the CRS EPRE with $\rho_{A,PDCCH}$ for the OFDM symbols without CRS and $\rho_{B,PDCCH}$ for the OFDM symbols with CRS. The ratio between $\rho_{B,PDCCH}$ and $\rho_{A,PDCCH}$ could be a cell-specific parameter and could be signaled to the UE through higher layer signaling. UE-specific signaling could be used to convey the level of $\rho_{A,PDCCH}$, which could then be used to derive $\rho_{B,PDCCH}$ through the ratio $\rho_{B,PDCCH}/\rho_{A,PDCCH}$. The ratio $\rho_{B,PDCCH}/\rho_{A,PDCCH}$ could be different from that for the PDSCH and may need to be signaled to the UE separately. In an alternative, the ratio $\rho_{B,PDCCH}/\rho_{A,PDCCH}$ could have a fixed offset from that of $\rho_A/\rho_B$, which is for the PDSCH. In that case, the ratio $\rho_{B,PDCCH}/\rho_{A,PDCCH}$ may not need to be signaled again.

In a fourth method for transmitting power level information, MIMO precoding may be used for new PDCCH transmissions and a dedicated demodulation reference signal (DM-RS) may be used for such PDCCH demodulation. The same precoding may be applied on both the PDCCH with HOM and the DM-RS. If the power level on the DM-RS and the PDCCH is the same or constant as pre-defined, the power level of the PDCCH does not need to be signaled as it is inherited in the received signal strength of the DM-RS. The use of precoding and the DM-RS for PDCCH transmission with HOM could be achieved in the legacy PDCCH region. For example, one RE could be used for DM-RS transmission in each REG. Alternatively, some RBs in the PDSCH region could be allocated for PDCCH transmission.

As mentioned above, some embodiments of the present disclosure deal with enhancement of the PDCCH through the use of an extended PDCCH. In these embodiments, a new PDCCH region is introduced in order to extend the PDCCH region and improve the performance of the PDCCH. The extended PDCCH (E-PDCCH) may be used with HOM. Also, the E-PDCCH may be used for a specific DCI or a reduced subset of DCIs in order to reduce the number of blind decodings performed by the UE. In addition, the E-PDCCH may be transmitted using new transmission schemes (such as variations of CoMP) that may be introduced in the future. Further, the E-PDCCH region allows FFR/ICIC (fractional frequency reuse/inter-cell interference coordination) to be enabled for the control information in the extended PDCCH region, which can improve the SINR.

The E-PDCCH region can be used together with the legacy control region. For example, the extended PDCCH region can be used as an overflow area to handle the PDCCH blocking scenario where the proportion of UEs able to use HOM in the legacy region has decreased and there are therefore more UEs needing scheduling than can be supported using QPSK in the legacy region. HOM can be applied in the E-PDCCH region as an extension of using HOM in the legacy PDCCH region.

It is noted that in 3GPP LTE systems, the transmission time interval consists of one subframe for unicast data transmissions. Therefore, the transmission time interval and a subframe can be used interchangeably for 3GPP LTE systems.

Additionally, in 3GPP LTE systems, the time-frequency resource unit used for data transmission is a resource block (RB). Therefore, the time-frequency resource unit and the RB can be used interchangeably for 3GPP LTE systems. In general, the transmission time interval and time-frequency resource unit can be defined with a wide variety of sizes and dimensions, and can be labeled with a wide variety of terminologies. Moreover, while 3GPP LTE terminology such as PDCCH, E-PDCCH, PDSCH, DCI, RRC are used to facilitate the description, such terms are to be broadly interpreted when the concepts described herein are applied to other systems.

In general, the E-PDCCH is designed to transmit control information in at least one time-frequency resource unit that would otherwise be used to carry a PDSCH. The E-PDCCH and at least one PDSCH can be multiplexed in a transmission time interval (TTI). A first set of configuration of the E-PDCCH can be semi-statically signaled and a second set of configuration of the E-PDCCH can be dynamically signaled. For 3GPP LTE, the TTI is a subframe, and the time-frequency resource unit is a resource block (RB). The first set of configuration can comprise one or more of: modulation level, DCI format, UE association, grouping of UEs, transmission mode, CCE aggregation level, PDCCH search space, and transmission point (TP) association. The second set of configuration can also comprise one or more of: modulation level, DCI format, UE association, grouping of UEs, transmission mode, CCE aggregation level, PDCCH search space, and TP association. It should be understood that these parameters are provided as examples and that the first and second configuration sets are not limited to these sets of parameters. Any of these or other parameters could be used alone or in any combination with any other parameters.

In other words, the configuration parameters of the E-PDCCH are signaled either semi-statically or dynamically. Normally, for a given configuration parameter, it is either signaled semi-statically via RRC signaling or dynamically via another downlink control information, but not both. On the other hand, it is possible that a given configuration parameter is signaled semi-statically via RRC signaling as a baseline setup, while a subsequent dynamic signaling can be used to modify the baseline setup.

More specifically, in legacy LTE releases, the PDCCH and PDSCH are multiplexed within a subframe using a time division multiplexing (TDM) approach. Although this has the advantage of allowing the UEs to perform micro-sleep, a disadvantage is that the UEs are more likely to see higher interference from the PDCCH transmitted by neighboring cells. In general, the PDCCH requires more robust signaling compared to the PDSCH. Since there is no HARQ (hybrid automatic repeat request) for the PDCCH, a lower target frame error rate (FER) is required for control information (target FER is 1%) compared to data (target FER is 10%).

One way to improve the performance of the PDCCH is to allow the PDCCH to be multiplexed with the PDSCH using an FDM approach. In this approach, an extended PDCCH region (E-PDCCH) can be defined by using some RBs normally used for the PDSCH. In this case, data and control span all the remaining OFDM symbols in a subframe. Power can then be shared between data and the new control region. By assigning a lower power for data, more power is available for the E-PDCCH. Extending the control region into the data region not only provides additional bandwidth for the control but also provides more effective power control since more power is available for the PDCCH. This gives more flexibility to the scheduler since the modulation and coding scheme for data may be reduced in order to boost the power for control.

As another alternative, the E-PDCCH could also be used in the TDM mode with the PDSCH or more generally, a combined FDM/TDM approach. For example, in the TDM approach, an extended PDCCH region can be defined by using some OFDM symbols normally used for the PDSCH. That is, the E-PDCCH and the PDSCH are shared over the time domain but each span all the frequency domain or only over certain RBs.

The E-PDCCH can be defined using a cell-specific RB hopping pattern. If a different hopping pattern is used by neighboring cells, the E-PDCCH will not collide with an E-PDCCH from another cell. In this case, only the number of RBs used might be signaled to the UEs to define the E-PDCCH region. Alternatively, the location of the E-PDCCH can be coordinated by neighboring cells. Coordination information, such as the E-PDCCH location and size, can be sent to the neighbor cells using X2 signaling. Note that here the X2 interface represents a typical interface between access points. Normally the access points are eNBs in the context of 3GPP LTE. By using a non-overlapping region for the E-PDCCH, neighboring cells can reduce the interference on the control information. This allows for FFR or ICIC on the new control region, which cannot be done for the normal PDCCH region. Such coordination for the E-PDCCH could also be implemented in a system with remote radio head (RRH) deployment such that E-PDCCH regions transmitted from the eNB and an RRH or between RRHs have little or no overlapping. In this scenario, the coordination could be done at an eNB that has a connection with an RRH with low latency and a high capacity link such as an optical link.

The RBs that are used for the E-PDCCH can be composed of REGs/CCEs as in the normal PDCCH.

A new DCI format may be defined to indicate the presence of the E-PDCCH and the configuration of the E-PDCCH, such as the RB allocations, the modulation, and other parameters. The DCI can be sent in the normal PDCCH region and can contain information necessary to decode the E-PDCCH. The UEs that may need to receive the E-PDCCH, such as future LTE release UEs, should read this new DCI format first. The legacy UEs, such as Rel8/Rel9 UEs, will not receive this new DCI format. A new RNTI may need to be defined to identify the new DCI format, for example, Extended-RNTI (E-RNTI).

Alternatively, RRC signaling from a higher layer may be used to inform the UEs of the E-PDCCH configuration, such as the RB allocations, the modulation, and other parameters. The configuration information can include information such as the location of the E-PDCCH, the number of resources used, and information required to properly decode the new region such as the modulation level and the MIMO mode. This information could be sent to the UEs during the RRC connection setup stage and may be updated from time to time (semi-statically) considering the loading situation.

The E-PDCCH can be used for new transmission schemes that may be introduced in the future without having the constraint of maintaining backward compatibility. Also, new DCI formats may be introduced for the new region without affecting legacy users and the normal PDCCH operation.

Multiple E-PDCCH regions may be configured in the same subframe, and the different regions may be used for different purposes. The number of E-PDCCH regions and the type of each region can be signaled to the UEs in the configuration information, which could be transmitted in a newly defined DCI or through high layer RRC signaling.

In one embodiment, an E-PDCCH region may be configured for a specific DCI format. For example, one region may be used for DL grants for MU-MIMO. In this case, all UEs that are configured for MU-MIMO are allocated DL grants in the new E-PDCCH region. Since only one DCI format is used, the blind decoding in this region is simplified. The E-PDCCH region may be added to the UE-specific search space. In other words, in addition to the existing UE-specific search space defined over the legacy control region, the UE-specific search space is expanded to include the extended PDCCH regions. The UE-specific search space in the normal PDCCH region may be reduced in order to not exceed the maximum number of blind decodings. This can be done by defining a new UE-specific search space for the E-PDCCH region. Similarly, in addition to the existing common specific search space defined over the legacy control region, the common search space can be expanded to include the extended PDCCH regions, so that information common to multiple UEs can be sent in the extended PDCCH regions.

In another embodiment, an E-PDCCH region may be configured for HOM. Since the power is shared between the E-PDCCH region and the PDSCH, power control can be used to boost the E-PDCCH while reducing the power for the PDSCH. This allows higher SINR for the E-PDCCH to use HOM, while lowering the modulation and coding scheme assigned to data. The eNB can perform FFR/ICIC on the control to further improve the SINR. Since the average SINR for the E-PDCCH region can be higher than for the normal PDCCH region, the opportunity for using HOM for control increases. The HOM applicability to the E-PDCCH could be preconfigured or signaled by the eNB. Techniques described above for the use of HOM in the PDCCH, such as how to handle blind decoding, search space, and power control, may be used in this solution. The power control information for the HOM could be signaled to the UE using an approach similar to that defined above.

In another embodiment, the existing signaling about the power ratio on the PDSCH region could be used, and no additional signaling would be needed if the power ratio between the E-PDCCH and the PDSCH has a certain fixed relation. In the simplest format, since the E-PDCCH shares OFDM symbols with the PDSCH, the same power is applied to REs of the E-PDCCH and REs of the PDSCH. When channel conditions allow the PDSCH to use HOM and/or spatial multiplexing, the E-PDCCH can use HOM as well.

UE-specific precoding transmission with a UE-specific DM-RS and cell-specific non-precoding transmission, such as transmit diversity, could both be applied to the new E-PDCCH region. Cell-specific non-precoding transmission could be applied to common control channels, while UE-specific precoding transmission could be applied to UE-specific control channels. The precoded UE-specific RS could be used for decoding a UE-specific precoded PDCCH. The precoded PDCCH could be limited to rank-1 transmission.

The E-PDCCH region could also be defined in both the time domain and the frequency domain, i.e., the number of OFDM symbols and the number of RBs. In this case, HOM could be used for a particular E-PDCCH. For example, the eNB could signal via RRC signaling that a particular E-PDCCH is only associated with HOM while another E-PDCCH is only associated with QPSK. Without ambiguity in the modulation scheme, the number of required blind decodings could be potentially reduced. UEs could be notified to use certain E-PDCCHs. For example, a UE with a better SINR could use an E-PDCCH region with HOM while other UEs could use an E-PDCCH with QPSK. The common control channel could always use an E-PDCCH with QPSK. Static relays might always be assigned to an E-PDCCH with HOM, since they tend to have improved channel conditions, e.g., because of over-the-roof antennas. After the E-PDCCH region is defined, CCE/REG concepts and the UE blind decoding procedure could be defined as in the legacy case. However, the number of aggregation levels/supported DCI formats could be reduced, which implies reduced blind decodings for the receiver. In this scenario, the search space could be defined as in the legacy case based on the UE/relay's identity.

Figure 4:
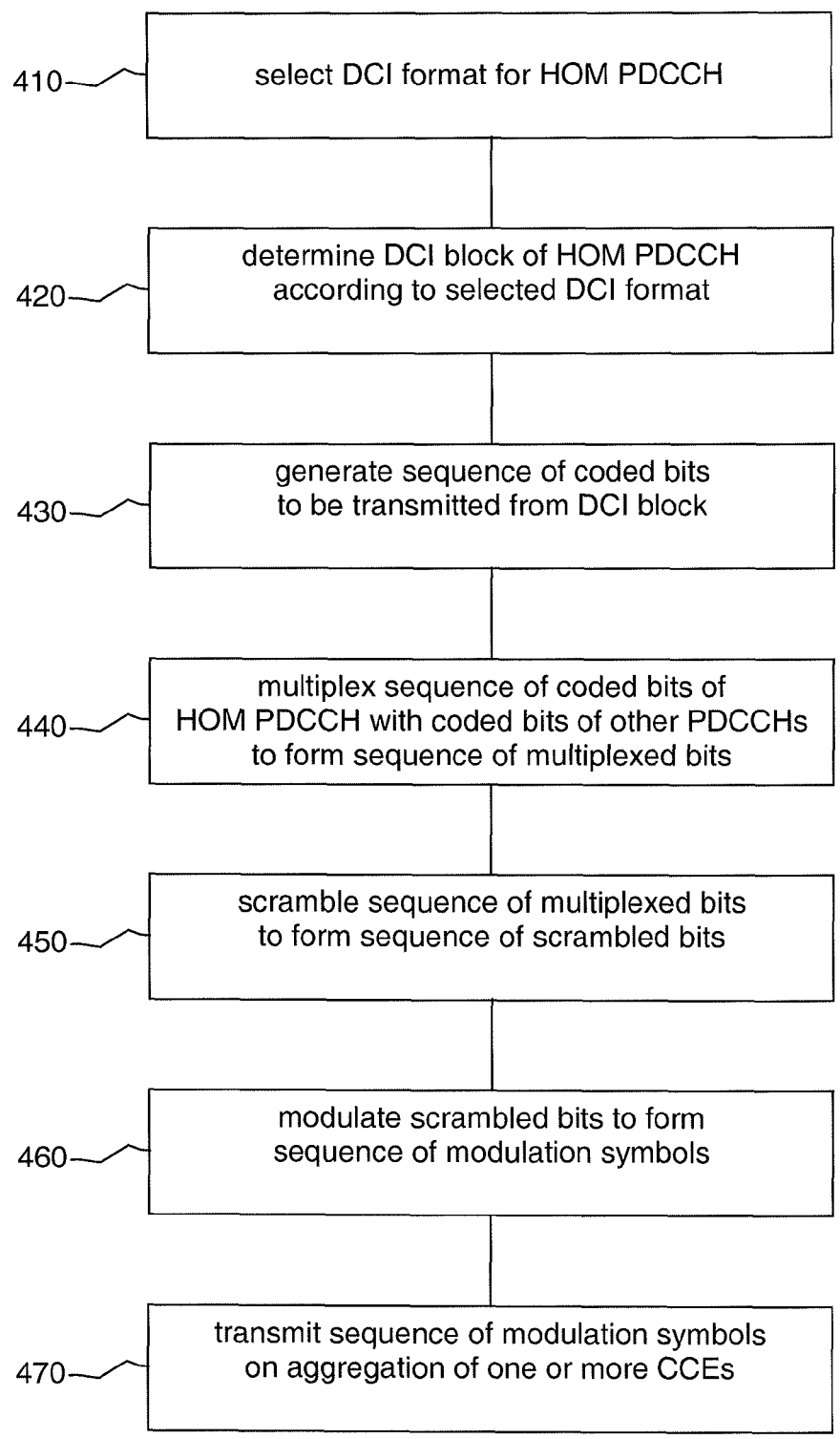
FIG. 4 illustrates a method for applying higher order modulation to a physical downlink control channel to transmit control information from an access node to a UE, according to an embodiment of the disclosure.

FIG. 4 illustrates a method 400 for applying HOM to a PDCCH to transmit control information from an access node to a UE, according to an embodiment of the disclosure. At block 410, a DCI format for a HOM PDCCH is selected. At block 420, a DCI block of the HOM PDCCH is determined according to the selected DCI format. At block 430, a sequence of coded bits to be transmitted from the DCI block is generated. At block 440, the sequence of coded bits of the HOM PDCCH is multiplexed with coded bits of other PDCCHs to form a sequence of multiplexed bits. At block 450, the sequence of multiplexed bits is scrambled to form a sequence of scrambled bits. At block 460, the scrambled bits are modulated to form a sequence of modulation symbols. The scrambled bits of the HOM PDCCH are modulated with higher order modulation and the higher order modulation maps three or more bits to one modulation symbol. The scrambled bits of the non-HOM PDCCH are modulated with non-higher order modulation and the non-higher order modulation maps less than three bits to one modulation symbol. At block 470, the sequence of modulation symbols is transmitted on an aggregation of one or more CCEs.

Figure 5:
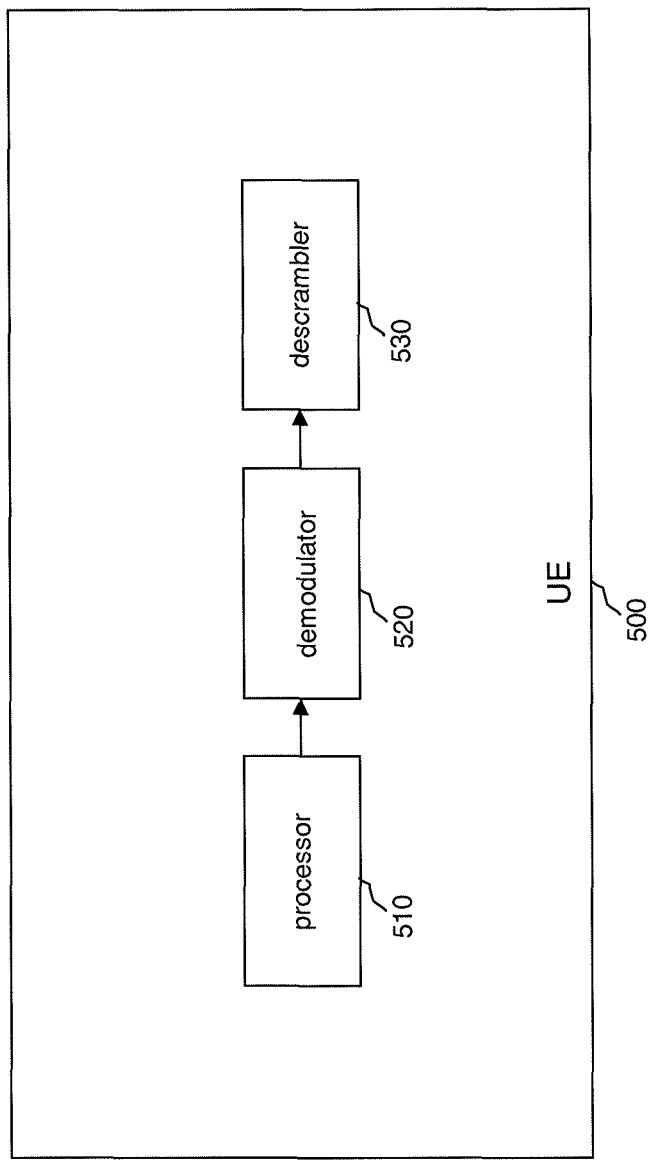
FIG. 5 illustrates a UE in which embodiments of the disclosure might be implemented.

FIG. 5 illustrates a UE 500 in which embodiments of the disclosure might be implemented. The UE 500 includes a processor 510, a demodulator 520, and a descrambler 530. The processor 510 is configured to determine when HOM is being used on a PDCCH received by the UE 500. The HOM maps three or more bits to one modulation symbol. The demodulator 520 is configured to demodulate a sequence of HOM modulation symbols that carry one or more PDCCHs when HOM is used. The descrambler 530 is configured to descramble PDCCH bits that use HOM separately from PDCCH bits that do not use HOM.

Figure 6:
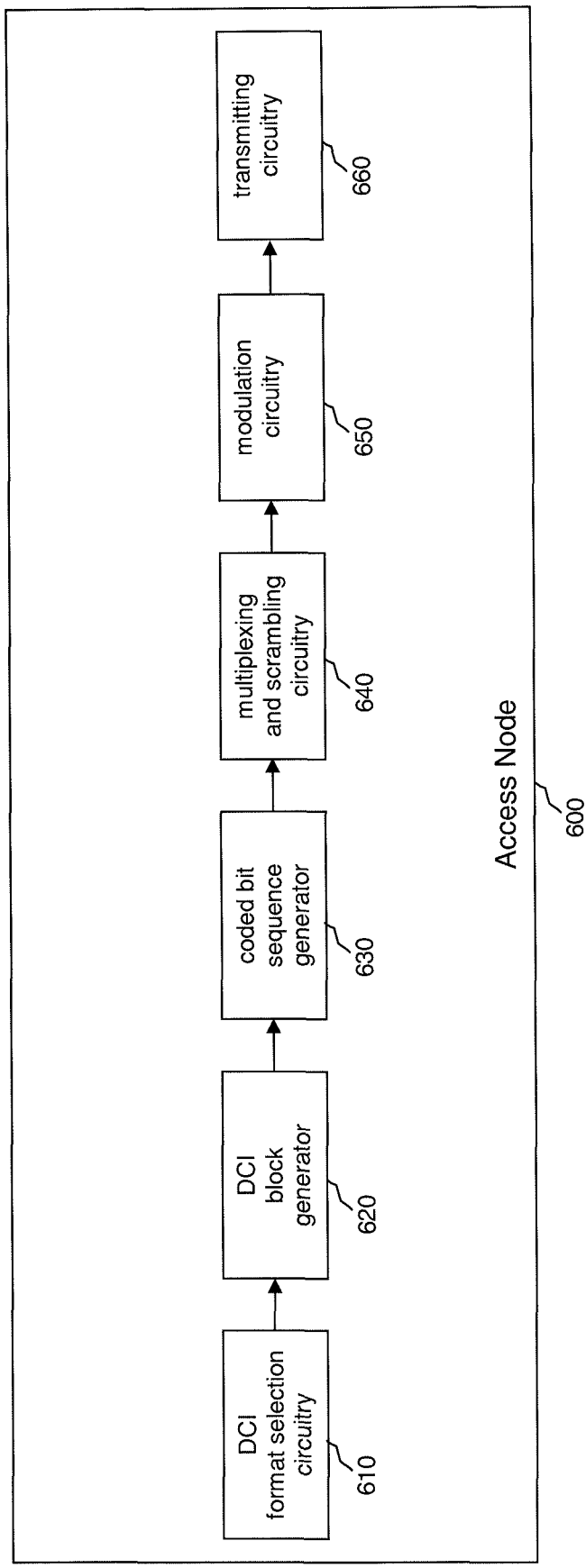
FIG. 6 illustrates an access node in which embodiments of the disclosure might be implemented.

FIG. 6 illustrates an access node 600 in which embodiments of the disclosure might be implemented. The access node 600 includes DCI format selection circuitry 610, a DCI block generator 620, a coded bit sequence generator 630, multiplexing and scrambling circuitry 640, modulation circuitry 650, and transmitting circuitry 660. The DCI format selection circuitry 610 is configured to select a DCI format for a PDCCH. The DCI block generator 620 is configured to generate a DCI block of a PDCCH according to the selected DCI format. A DCI block is a sequence of information bits according to a selected DCI format. The coded bit sequence generator 630 is configured to generate a sequence of coded bits of the PDCCH from the DCI block. The multiplexing and scrambling circuitry 640 is configured to multiplex and scramble the sequence of coded bits of two or more PDCCHs to form a sequence of scrambled bits. The modulation circuitry 650 is configured to generate a sequence of modulation symbols from the sequence of scrambled bits. The modulation level of a first PDCCH is selected to be HOM when a HOM criterion is satisfied. The HOM maps three or more bits to one modulation symbol. The modulation level of a second PDCCH is selected to be non-HOM. The non-HOM maps less than three bits to one modulation symbol. The transmitting circuitry 660 is configured to transmit the sequence of modulation symbols.

Figure 8:
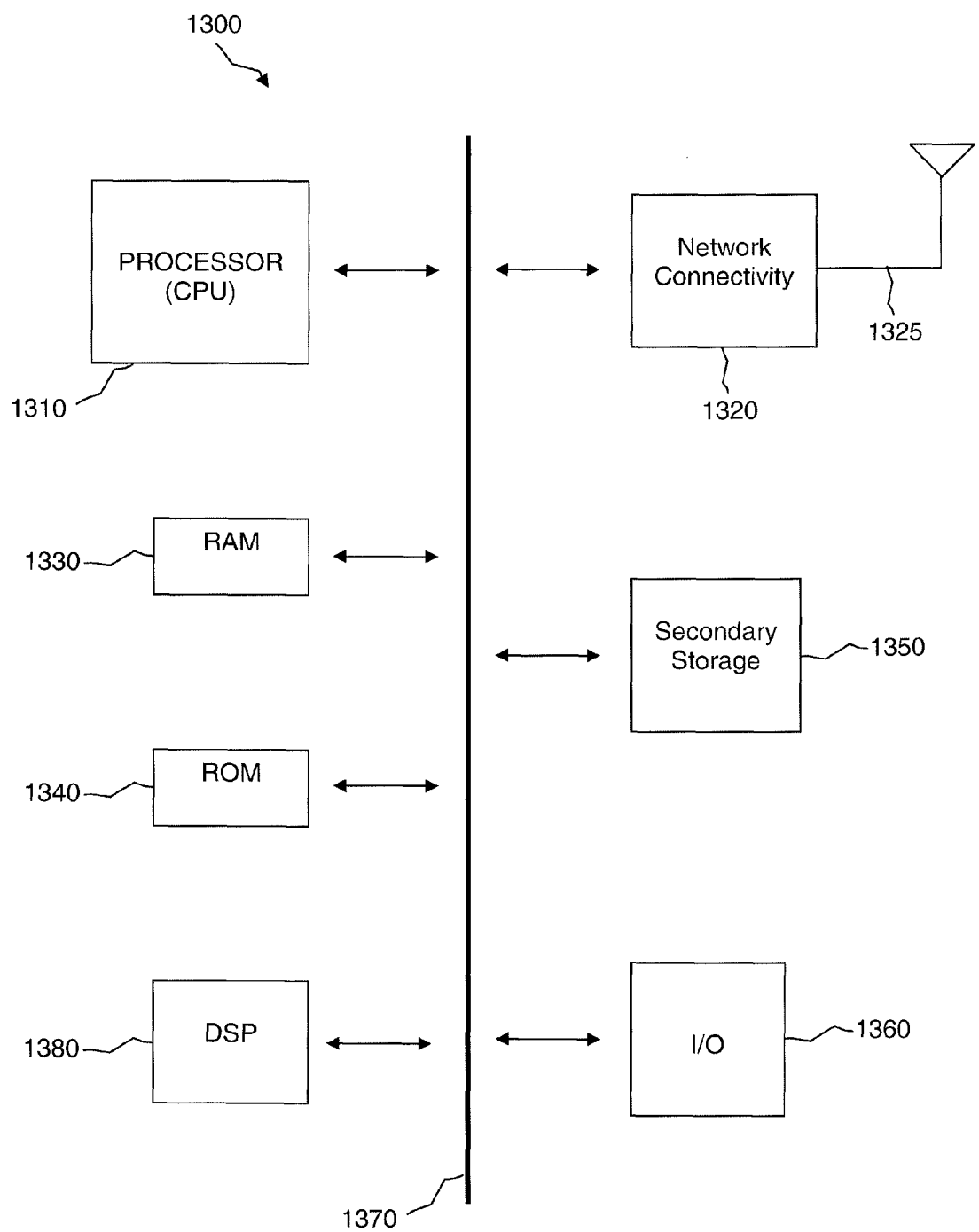
FIG. 8 illustrates a processor and related components suitable for implementing the several embodiments of the present disclosure.

The UE 500 and other components described above might include a processing component that is capable of executing instructions related to the actions described above. FIG. 8 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method is provided for applying HOM to a PDCCH to transmit control information from an access node to a UE. The method comprises: selecting a DCI format for a HOM PDCCH; determining a DCI block of the HOM PDCCH according to the selected DCI format; generating a sequence of coded bits to be transmitted from the DCI block; multiplexing the sequence of coded bits of the HOM PDCCH with coded bits of a non-HOM PDCCH to form a sequence of multiplexed bits; scrambling the sequence of multiplexed bits to form a sequence of scrambled bits; modulating the scrambled bits to form a sequence of modulation symbols, wherein the scrambled bits of the HOM PDCCH are modulated with higher order modulation and the higher order modulation maps three or more bits to one modulation symbol, and wherein the scrambled bits of the non-HOM PDCCH are modulated with non-higher order modulation and the non-higher order modulation maps less than three bits to one modulation symbol; and transmitting the sequence of modulation symbols on an aggregation of one or more CCEs.

In another embodiment, a UE is provided. The UE includes a processor, a demodulator, and a descrambler. The processor is configured to determine when HOM is being used on a PDCCH received by the UE. The HOM maps three or more bits to one modulation symbol. The demodulator is configured to demodulate a sequence of HOM modulation symbols that carry one or more PDCCHs when HOM is used. The descrambler is configured to descramble PDCCH bits that use HOM separately from PDCCH bits that do not use HOM.

In another embodiment, an access node is provided. The access node includes DCI format selection circuitry, a DCI block generator, a coded bit sequence generator, multiplexing and scrambling circuitry, modulation circuitry, and transmitting circuitry. The DCI format selection circuitry is configured to select a DCI format for a PDCCH. The DCI block generator is configured to generate a DCI block of a PDCCH according to the selected DCI format. The coded bit sequence generator is configured to generate a sequence of coded bits of the PDCCH from the DCI block. The multiplexing and scrambling circuitry is configured to multiplex and scramble the sequence of coded bits of two or more PDCCHs to form a sequence of scrambled bits. The modulation circuitry is configured to generate a sequence of modulation symbols from the sequence of scrambled bits. The modulation level of a first PDCCH is selected to be HOM when a HOM criterion is satisfied. The HOM maps three or more bits to one modulation symbol. The modulation level of a second PDCCH is selected to be non-HOM. The non-HOM maps less than three bits to one modulation symbol. The transmitting circuitry is configured to transmit the sequence of modulation symbols.

In another embodiment, a method for a UE to determine a transmit power level of a PDCCH is provided. The method comprises at least one of: the UE receiving a transmission of a ratio of a power level of the PDCCH to a power level of a CRS and deriving the transmit power level of the PDCCH based on the ratio of the power level of the PDCCH to the power level of the CRS; the UE receiving a transmission of a difference between the power level of the PDCCH and the power level of the CRS and deriving the transmit power level of the PDCCH based on the difference between the power level of the PDCCH and the power level of the CRS; the UE deriving the ratio of the power level of the PDCCH to the power level of the CRS based on a ratio of a power level of a PDSCH to the power level of the CRS and deriving the transmit power level of the PDCCH based on the ratio of the power level of the PDCCH to the power level of the CRS; and the UE deriving the power level of the PDCCH from the power level of a DM-RS.

The following are incorporated herein by reference for all purposes: 3GPP TS 36.211 and 3GPP TS 36.213.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for applying higher order modulation (HOM) to a physical downlink control channel (PDCCH) to transmit control information from an access node to a user equipment (UE), the method comprising:
   selecting a downlink control information (DCI) format for a HOM PDCCH;
   determining a DCI block of the HOM PDCCH according to the selected DCI format;
   generating a sequence of coded bits to be transmitted from the DCI block;
   multiplexing the sequence of coded bits of the HOM PDCCH with coded bits of a non-HOM PDCCH to form a sequence of multiplexed bits;
   scrambling the sequence of multiplexed bits to form a sequence of scrambled bits;
   modulating the scrambled bits to form a sequence of modulation symbols, wherein the scrambled bits of the HOM PDCCH are modulated with higher order modulation and the higher order modulation maps three or more bits to one modulation symbol, and wherein the scrambled bits of the non-HOM PDCCH are modulated with non-higher order modulation and the non-higher order modulation maps less than three bits to one modulation symbol; and
   transmitting the sequence of modulation symbols on an aggregation of one or more control channel elements (CCEs).

2. The method of claim 1, wherein HOM is applied when the PDCCH is associated with one of a cell radio network temporary identifier (C-RNTI) and a semi-persistent scheduling RNTI (SPS-RNTI).

3. The method of claim 1, wherein HOM is applied when the DCI format belongs to a specified set of DCI types.

4. The method of claim 1, wherein the use of the HOM PDCCH is associated with an integer CCE aggregation level.

5. The method of claim 1, wherein the use of the HOM PDCCH is associated with a fractional number of CCEs.

6. The method of claim 1, wherein radio resource control (RRC) signaling is used to inform the UE that HOM is being used on the HOM PDCCH.

7. The method of claim 1, wherein the use of HOM PDCCH is associated with a transmit power control command.

8. The method of claim 7, wherein the transmit power control command is sent via a higher layer signaling.

9. The method of claim 1, wherein the use of HOM PDCCH is associated with a transmission mode used for transmission of a physical downlink shared channel (PDSCH) that belongs to a specified set of transmission modes, and wherein the PDSCH is associated with the PDCCH.

10. The method of claim 1, wherein the DCI block carried by the HOM PDCCH is for a first UE and the DCI block carried by the non-HOM PDCCH is for a second UE, and wherein the HOM PDCCH and the non-HOM PDCCH are transmitted in the same subframe.

11. The method of claim 10, wherein for a PDCCH using HOM, the coded bits on CCE number n are scrambled by a scrambling sequence $c_{HOM}(q_2 \times N_{RE} \times n)$, $c_{HOM}(q_2 \times N_{RE} \times n+1)$, ..., $c_{HOM}(q_2 \times N_{RE} \times (n+1)-1)$, and the scrambled bits are obtained by $\bar{b}(i)=(b(i)+c_{HOM}(i)) \mod 2$ and wherein, for a non-HOM PDCCH, bits on CCE number m are scrambled by a scrambling sequence $c_{non-HOM}(q_1 \times N_{RE} \times n)$, $c_{non-HOM}(q_1 \times N_{RE} \times m+1)$, ..., $c_{non-HOM}(q_1 \times N_{RE} \times (m+1)-1)$ and the scrambled bits are obtained by $\bar{b}(i)=(b(i)+c_{non-HOM}(i)) \mod 2$ where integer $q_1$ is the order of the non-HOM, integer $q_2$ is the order of the HOM, $b(i)$ is the code bit before scrambling, and $\bar{b}(i)$ is the scrambled bit.

12. The method of claim 1, further comprising scrambling the HOM PDCCHs separately from scrambling the non-HOM PDCCHs.

13. The method of claim 12, wherein, for a HOM PDCCH, the coded bits on a CCE are scrambled by a scrambling sequence of length $q_2 \times N_{RE}$, where integer $q_2$ is the order of the HOM, $q_2>2$, and $N_{RE}$ is the number of useful resource elements (REs) in a CCE.

14. The method of claim 1, wherein the transmit power level of the PDCCH is determined at the UE by at least one of:
   receiving a transmission of a ratio of a power level of the PDCCH to a power level of a cell-specific reference signal (CRS) and deriving the transmit power level of the PDCCH based on the ratio of the power level of the PDCCH to the power level of the CRS;
   receiving a transmission of a difference between the power level of the PDCCH and the power level of the CRS and deriving the transmit power level of the PDCCH based on the difference between the power level of the PDCCH and the power level of the CRS;
   deriving the ratio of the power level of the PDCCH to the power level of the CRS based on a ratio of power level of a physical downlink shared channel (PDSCH) to the power level of the CRS and deriving the transmit power level of the PDCCH based on the ratio of the power level of the PDCCH to the power level of the CRS; and
   deriving the power level of the PDCCH from the power level of a demodulation reference signal (DM-RS).

15. The method of claim 1, wherein, a transmit power assigned to control channel resource elements varies as a function of orthogonal frequency division multiplexing symbol indices.

16. The method of claim 1, wherein a transmit power assigned to control channel resource elements varies as a function of DCI size.

17. The method of claim 1, wherein a transmit power assigned to control channel resource elements varies as a function of the aggregation level of the CCEs.

18. A user equipment (UE), comprising:
a processor configured to determine when higher order modulation (HOM) is being used on a physical downlink control channel (PDCCH) received by the UE, wherein the HOM maps three or more bits to one modulation symbol;
a demodulator configured to demodulate a sequence of HOM modulation symbols that carry one or more PDCCHs when HOM is used; and
a descrambler configured to descramble PDCCH bits that use HOM separately from PDCCH bits that do not use HOM.

19. The UE of claim 18, wherein the HOM is determined by the processor when the PDCCH is associated with one of a cell radio network temporary identifier (C-RNTI) and a semi-persistent scheduling RNTI (SPS-RNTI).

20. The UE of claim 18, wherein the HOM is determined by the processor when a downlink control information (DCI) format used by the PDCCH belongs to a specified set of DCI types.

21. The UE of claim 18, wherein the HOM is determined by the processor when radio resource control (RRC) signaling has informed the UE that HOM is being used.

22. The UE of claim 18, wherein the HOM is determined by the processor when a transmission mode being used for the transmission of a physical downlink shared channel (PDSCH) belongs to a specified set of transmission modes, where the PDSCH is associated with the PDCCH.

23. The UE of claim 18, wherein the UE receives at least one PDCCH that uses HOM, the at least one PDCCH that uses HOM having been scrambled by a scrambling sequence of length $q_2 \times N_{RE}$ for each CCE occupied, where integer $q_2$ is the order of the HOM, $q_2 > 2$, and $N_{RE}$ is the number of useful resource elements (REs) in a CCE.

24. The UE of claim 18, wherein the UE determines the transmit power level of the PDCCH by at least one of:
receiving a transmission of a ratio of a power level of the PDCCH to a power level of a cell-specific reference signal (CRS) and deriving the transmit power level of the PDCCH based on the ratio of the power level of the PDCCH to the power level of the CRS;
receiving a transmission of a difference between the power level of the PDCCH and the power level of the CRS and deriving the transmit power level of the PDCCH based on the difference between the power level of the PDCCH and the power level of the CRS;
deriving the ratio of the power level of the PDCCH to the power level of the CRS based on a ratio of power level of a physical downlink shared channel (PDSCH) to the power level of the CRS and deriving the transmit power level of the PDCCH based on the ratio of the power level of the PDCCH to the power level of the CRS; and
deriving the power level of the PDCCH from the power level of a demodulation reference signal (DM-RS).

25. The UE of claim 24, wherein, in detecting the PDCCH, the UE assumes that varying power levels are assigned to control channel resource elements that carry the PDCCH, and wherein information on the varying power levels is provided to the UE before the PDCCH is received in the current transmission time interval.

26. An access node, comprising:
a downlink control information (DCI) format selection circuitry configured to select a DCI format for a physical downlink control channel (PDCCH);
a DCI block generator configured to generate a DCI block of the PDCCH according to the selected DCI format;
a coded bit sequence generator configured to generate a sequence of coded bits of the PDCCH from the DCI block;
a multiplexing and scrambling circuitry configured to multiplex and scramble the sequence of coded bits of two or more PDCCHs to form a sequence of scrambled bits;
a modulation circuitry configured to generate a sequence of modulation symbols from the sequence of scrambled bits, wherein the modulation level of a first PDCCH is selected to be higher order modulation (HOM) when a HOM criterion is satisfied, and wherein the HOM maps three or more bits to one modulation symbol, and wherein the modulation level of a second PDCCH is selected to be non-higher order modulation (non-HOM), and wherein the non-HOM maps less than three bits to one modulation symbol; and
a transmitting circuitry configured to transmit the sequence of modulation symbols.

27. The access node of claim 26, wherein the HOM criterion comprises that the DCI format belongs to a specified set of DCI types.

28. The access node of claim 26, wherein the HOM criterion comprises that a fractional number of control channel elements (CCEs) is being used to carry the first PDCCH.

29. The access node of claim 26, wherein the HOM criterion comprises that radio resource control (RRC) signaling indicates that HOM is being used.

30. The access node of claim 26, wherein the HOM criterion comprises that a transmission mode used for the transmission of a physical downlink shared channel (PDSCH) belongs to a specified set of transmission modes, where the PDSCH is associated with the first PDCCH.

31. The access node of claim 26, wherein the access node scrambles PDCCHs that use HOM separately from PDCCHs that do not use HOM.

32. The access node of claim 26, wherein the access node provides information related to the transmit power level of the PDCCH by at least one of:
transmitting a ratio of a power level of the first PDCCH to a power level of a cell-specific reference signal (CRS); and
transmitting a difference between the power level of the first PDCCH and the power level of the CRS.

33. The access node of claim 32, wherein, the power assigned to control channel resource elements varies as a function of orthogonal frequency division multiplexing symbol indices.

34. The access node of claim 26, wherein the access node transmits at least one PDCCH that uses HOM and at least one PDCCH that does not use HOM, the at least one PDCCH that uses HOM having been scrambled by a scrambling sequence of length $q_2 \times N_{RE}$ for each CCE occupied, where integer $q_2$ is the order of the HOM, $q_2 > 2$, and $N_{RE}$ is the number of useful resource elements (REs) in a CCE.

35. A method for a user equipment (UE) to determine a transmit power level of a physical downlink control channel (PDCCH), the method comprising at least one of:
the UE receiving a transmission of a ratio of a power level of the PDCCH to a power level of a cell-specific reference signal (CRS) and deriving the transmit power level of the PDCCH based on the ratio of the power level of the PDCCH to the power level of the CRS;

the UE receiving a transmission of a difference between the power level of the PDCCH and the power level of the CRS and deriving the transmit power level of the PDCCH based on the difference between the power level of the PDCCH and the power level of the CRS;

the UE deriving the ratio of the power level of the PDCCH to the power level of the CRS based on a ratio of a power level of a physical downlink shared channel (PDSCH) to the power level of the CRS and deriving the transmit power level of the PDCCH based on the ratio of the power level of the PDCCH to the power level of the CRS; and the UE deriving the power level of the PDCCH from the power level of a demodulation reference signal (DM-RS).

* * * * *

UNITED STATES PATENT AND TRADEMARK OFFICE
CERTIFICATE OF CORRECTION

PATENT NO. : 8,537,862 B2  
APPLICATION NO. : 13/174334  
DATED : September 17, 2013  
INVENTOR(S) : Yufei Blankenship et al.

It is certified that error appears in the above-identified patent and that said Letters Patent is hereby corrected as shown below:

On the Title Page

Item (75), Inventors replace "Sewan" with -- "Suwon" --

Item (73), Assignee replace "Blackberry Limited" with -- "BlackBerry Limited" --

In the Claims

Column 24, Line 28, replace " $\tilde{b}(i) = (b(i) + c_{HOM}(i)) \mod 2$ " with -- $\tilde{b}(i) = (b(i) + c_{HOM}(i)) \mod 2$ , --

Column 24, Line 30, replace " $c_{non-HOM}(q_1 \times N_{RE} \times n)$ , " with -- $c_{non-HOM}(q_1 \times N_{RE} \times m)$ , --

Column 24, Line 31, replace "-1)" with -- "-1)," --

Column 24, Line 32, replace "2" with -- "2," --

Signed and Sealed this  
Fifth Day of November, 2013

Teresa Stanek Rea  
*Deputy Director of the United States Patent and Trademark Office*